US012476009B2

(12) United States Patent
Shen-Orr et al.

(10) Patent No.: US 12,476,009 B2
(45) Date of Patent: Nov. 18, 2025

(54) IMMUNE AGE AND USE THEREOF

(71) Applicant: TECHNION RESEARCH & DEVELOPMENT FOUNDATION LIMITED, Haifa (IL)

(72) Inventors: Shai S. Shen-Orr, Haifa (IL); Yishai Menachem Pickman, Lod (IL); Ayelet Alpert, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 1411 days.

(21) Appl. No.: 17/053,785

(22) PCT Filed: May 7, 2019

(86) PCT No.: PCT/IL2019/050523
§ 371 (c)(1),
(2) Date: Nov. 8, 2020

(87) PCT Pub. No.: WO2019/215740
PCT Pub. Date: Nov. 14, 2019

(65) Prior Publication Data
US 2021/0287807 A1  Sep. 16, 2021

Related U.S. Application Data

(60) Provisional application No. 62/667,698, filed on May 7, 2018.

(51) Int. Cl.
*G16H 50/30* (2018.01)
*G01N 33/68* (2006.01)
*G16B 50/30* (2019.01)
*G16H 10/60* (2018.01)

(52) U.S. Cl.
CPC ......... *G16H 50/30* (2018.01); *G01N 33/6803* (2013.01); *G16B 50/30* (2019.02); *G16H 10/60* (2018.01)

(58) Field of Classification Search
CPC .... G16H 50/30; G16H 10/60; G01N 33/6803; G01N 2800/24; G01N 2800/50; G01N 2800/7042; G01N 33/56972; G16B 50/30
See application file for complete search history.

(56) References Cited

U.S. PATENT DOCUMENTS 10,119,959 B2   11/2018  Shen-Orr et al.
2012/0021414 A1  1/2012  Shen-Orr et al.

FOREIGN PATENT DOCUMENTS

WO          2007145333 A1       12/2007
WO          WO-2018027228 A1 *   2/2018  ........... C12Q 1/6827

OTHER PUBLICATIONS

Martínez de Toda I, Maté I, Vida C, Cruces J, De la Fuente M. Immune function parameters as markers of biological age and predictors of longevity. Aging (Albany NY). 2016;8(11):3110-3119. doi:10.18632/aging.101116 (Year: 2016).*
Peters, M., Joehanes, R., Pilling, L et al. The transcriptional landscape of age in human peripheral blood. Nat Commun 6, 8570 (2015). https://doi.org/10.1038/ncomms9570 (Year: 2015).*
Marioni, R.E., Shah, S., McRae, A.F. et al. DNA methylation age of blood predicts all-cause mortality in later life. Genome Biol 16, 25 (2015). https://doi.org/10.1186/s13059-015-0584-6 (Year: 2015).*
Perna, L., Zhang, Y., Mons, U. et al. Epigenetic age acceleration predicts cancer, cardiovascular, and all-cause mortality in a German case cohort. Clin Epigenet 8, 64 (2016). https://doi.org/10.1186/s13148-016-022 (Year: 2016).*
Palmer, C., Diehn, M., Alizadeh, A.A. and Brown, P.O., 2006. Cell-type specific gene expression profiles of leukocytes in human peripheral blood. BMC genomics, 7, pp. 1-15. (Year: 2006).*
Hirokawa K., Utsuyama M. (2018) Assessment of Age-Related Decline of Immunological Function and Possible Methods for Immunological Restoration in Elderly. In: Fulop T., Franceschi C., Hirokawa K., Pawelec G. (eds) Handbook of Immunosenescence. Springer, Cham First Online: Dec. 8, 2017, 38 pages.
Alpert, A., Pickman, Y., Leipold, M. et al. A clinically meaningful metric of immune age derived from high-dimensional longitudinal monitoring. Nat Med 25, 487-495 (2019).
Shen-Orr, S. S. et al. Defective Signaling in the JAK-STAT Pathway Tracks with Chronic Inflammation and Cardiovascular Risk in Aging Humans. Cell Syst. 3, 374-384.e4 (2016).
Dorshkind, K., Montecino-Rodriguez, E. & Signer, R. A. J. The ageing immune system: is it ever too old to become young again? Nat. Rev. Immunol. 9, 57-62 (2009).
Gruver, A. L., Hudson, L. L. & Sempowski, G. D. Immunosenescence of ageing. J. Pathol. 211, 144-56 (2007).
Carr EJ, Dooley J, Garcia-Perez JE, Lagou V, Lee JC, Wouters C, Meyts I, Goris A, Boeckxstaens G, Linterman MA, Liston A. The cellular composition of the human immune system is shaped by age and cohabitation. Nat Immunol. Apr. 2016;17(4):461-468.
Nikolich-Žugich, J. The twilight of immunity: emerging concepts in aging of the immune system. Nat Immunol 19, 10-19 (2018).
López-Otín C, Blasco MA, Partridge L, Serrano M, Kroemer G. The hallmarks of aging. Cell. Jun. 6, 2013;153(6):1194-217.
Franceschi C, Bonafè M, Valensin S, Olivieri F, De Luca M, Ottaviani E, De Benedictis G. Inflamm-aging. An evolutionary perspective on immunosenescence. Ann N Y Acad Sci. Jun. 2000;908:244-54.
Bektas A, Schurman SH, Sen R, Ferrucci L. Aging, inflammation and the environment. Exp Gerontol. May 2018; 105:10-18.

(Continued)

Primary Examiner — Karlheinz R. Skowronek
Assistant Examiner — Nidhi Dharithreesan
(74) Attorney, Agent, or Firm — The Roy Gross Law Firm, LLC; Roy D. Gross

(57) ABSTRACT

Methods of determining an immunological age of a subject comprising measuring relative abundance of at least 3 immune cell populations in a blood sample from the subject and determining an immunological age of the subject based on the measured relative abundances are provided. Methods of diagnosing increased risk of illness and mortality are also provided, as are kits for performing these methods.

11 Claims, No Drawings

(56) References Cited

OTHER PUBLICATIONS

Pawelec, Graham. (2018). Immune parameters associated with mortality in the elderly are context-dependent: lessons from Sweden, Holland and Belgium. Biogerontology. epub Nov. 2017, 9 pages.

Lin Y, Kim J, Metter EJ, Nguyen H, Truong T, Lustig A, Ferrucci L, Weng NP. Changes in blood lymphocyte numbers with age in vivo and their association with the levels of cytokines/cytokine receptors. Immun Ageing. Aug. 18, 2016;13:24.

Merino J, Martínez-González MA, Rubio M, Inogés S, Sánchez-Ibarrola A, Subira ML. Progressive decrease of CD8high+ CD28+ CD57—cells with ageing. Clin Exp Immunol. Apr. 1998, 112(1):48-51.

Hirokawa K., Utsuyama M. (2018) Assessment of Age-Related Decline of Immunological Function and Possible Methods for Immunological Restoration in Elderly. In: Fulop T., Franceschi C., Hirokawa K., Pawelec G. (eds) Handbook of Immunosenescence. Springer, Cham. https://doi.org/10.1007/978-3-319-64597-1_73-1, 27 pages.

Strioga M, Pasukoniene V, Characiejus D. CD8+ CD28- and CD8+ CD57+ T cells and their role in health and disease. Immunology. Sep. 2011;134(1):17-32. doi: 10.1111/j.1365-2567.2011.03470.x. Epub Jun. 29, 2011. PMID: 21711350; PMCID: PMC3173691.

\* cited by examiner

IMMUNE AGE AND USE THEREOF

CROSS REFERENCE TO RELATED APPLICATIONS

This application is a National Phase of No. PCT/IL2019/050523 having International filing date of May 7, 2019, which claims the benefit of priority of U.S. Provisional Patent Application No. 62/667,698, filed May 7, 2018, the contents of which are all incorporated herein by reference in their entirety.

FIELD OF INVENTION

The present invention is in the field of immune aging.

BACKGROUND OF THE INVENTION

The human immune-system changes with age, ultimately leading to a clinically evident profound deterioration resulting in high morbidity and mortality rates attributed to infectious and chronic diseases. At the cellular level, population-based cross-sectional studies have identified many immune components as changing with age, spanning both the innate and adaptive arms, and involving both changes in cellular frequencies and altered functional capacity. Concomitant with the overall down-regulation of immune responsiveness with aging, a moderate rise in circulating inflammatory mediators is often observed, commonly termed as "inflammaging", that appears to be central to most chronic diseases of older age and is the root cause of decreased cellular responsiveness.

However, aging does not affect all immune-systems equally. Genetics was shown to be involved in shaping the immune-system composition, an effect that declines with age due to the effect of an individual's life history. Taken together, genetic and environmental variation introduces a substantial inter-individual variability of many immune features that increases with age. Previous studies have utilized this variability to identify biomarkers based on individual immune phenotypes at baseline that correlate with clinical outcomes. A recent cross-sectional study has shown that the healthy human immune states are continuous rather than stratified into discrete phenotypes, with the major axis of variation dictated by immune-senescence features, such that individuals of the same chronological age may differ in their immune age. Such decoupling has been further shown in other biological age metrics: both molecular (e.g. methylation) and clinical (e.g. frailty).

The high inter-individual variability highlights the necessity of longitudinal tracking to study the gradual changes the immune-system undergoes with age. However, to date, longitudinal studies tracking the immune-system over time have been either short in duration (weeks-months) or low in resolution, covering a small fraction of the system's dynamics. The relative stability of the immune-system implies that changes occurring over short timespans are subtle, mistakenly suggesting that individuals' immune-profiles do not change whereas a longer tracking period may allow for their systematic longitudinal characterization. Furthermore, the immune-system complexity and variability implies that data from independent studies addressing different immune-components cannot be completely merged to yield comprehensive system-wide understanding of immunological aging and low-dimensional biomarkers cannot capture the system's complexity reproducibly.

As a system that monitors the external and internal environments of an individual, the immune-system changes as a function of the environment. Dynamics of such systems are commonly studied throughout the natural world using a dynamical systems framework that represents a system's state as a point in a high-dimensional space corresponding to the amount of each system's components. The dynamic behavior of the system is represented by the rate of change of the system's components at each point in space. Though most points in space exhibit non-zero rates, special emphasis is placed upon those points at which the system's rate is zero, corresponding to steady-states on which the system may converge to yield attractor points representing homeostatic states where the system is robust to small perturbations. Methods of monitoring and measuring immune aging and using that monitoring prognostically is greatly needed.

SUMMARY OF THE INVENTION

The present invention provides methods of determining the immunological age of a subject. Method of diagnosing increased risk of illness and mortality are also provided. Lastly, kits and computer program products for performing these methods are provided.

According to a first aspect, there is provided a method of determining the immunological age of subject, comprising:
  a. measuring relative abundance of at least 3 immune cell populations in a blood sample from the subject; and
  b. determining an immunological age of the subject by at least one of:
    i. comparing the measurement of relative abundance of immune cell populations to a dataset of measurements of immune cell population relative abundance in subjects with predetermined immunological ages; and
    ii. combining the measurement of relative abundances with data of measurements of relative abundance from at least 19 other subjects to produce a database, calculating from the database a trajectory for all at least 20 subjects based on the measurements of relative abundance;
  thereby determining the immunological age of the subject.

According to another aspect, there is provided a method of diagnosing increased risk of mortality in a subject, the method comprising:
  a. determining an immunological age of the subject; and
  b. comparing the subject's immunological age to the subject's chronological age or comparing the subject's immunological to an immunological age of at least one other subject with the same chronological age;
  wherein an immunological age greater than the chronological age or an immunological age greater than the immunological age of the at least one other subject, indicates the subject is at increased risk of mortality;
  thereby diagnosing increased risk of mortality in a subject.

According to another aspect, there is provided a kit comprising at least one of:
  a. detecting molecules for determining the relative abundance of immune cells from at least five immune cell population in a chronological sample, wherein the immune cell populations are selected from the group consisting of: naïve CD8+ T cells, effector CD8+ T cells, CD28– CD8+ T cells, B cells, CXCR5+CD4+ T cells, CD161– CD45RA+ T regulator cells, naïve CD4+ T cells, CXCR5+ CD8+ T cells, HLADR–

CD38+ CD4+ T cells, Th17 CXCR5–CD4+ T cells, T cells, CD85j+ CD8+ T cells, CD57+ CD8+ T cells, Th2 non-TFH CD4+ T cells, PD1+ CD8+ T cells, and effector memory CD4+ T cells; and b. detecting molecules specific for determining the expression levels of at least 20 genes selected from the group consisting of: ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, HLA-DOB, AGPAT4, AKAP2, APBB1, ASCL2, C1orf21, C20orf3, CHST12, CST7, CTSW, EEF1B2, ELL3, FAM113B, FAM129C, FCER2, FCGBP, FCRL6, FGFBP2, FLT3LG, GAL3ST4, GPR56, GPR68, GZMH, HOXC4, ID3, LLGL2, LTB, MMP23A, MOBKL2B, MXRA7, MYO6, NKG7, NOG, NOSIP, PCYOX1L, PLEKHF1, PMEPA1, RNF157, RPL12, RPL24, RPS10, RPS13, RPS5, SAP30, SESN2, SYTL3, TBX21, TGFBR3, TNFRSF25, TSPAN13, TTC28, YPEL1, ZNF154, ZNF563, ZNF772, ZSCAN18, C2orf89, PATL2, TTC38, PRR5L, SGK223, NCRNA00287, IGHM, HLA-DOA and IGHV5-78.

According to another aspect, there is provided a computer program product for determining the immunological age of subject, comprising a non-transitory computer-readable storage medium having program code embodied thereon, the program code executable by at least one hardware processor to:

a. receive measurements of relative frequencies of at least 3 immune cell populations in a blood sample from the subject, b. calculate an immunological age of the subject by at least one of
 i. compare the measurements of relative abundance of immune cell populations to a dataset of measurements of immune cell population relative abundance in subjects with predetermined immunological ages; and
 ii. combine the measurement of relative abundance with data of measurements of relative abundance from at least 19 other subjects to produce a database, from the database calculate a trajectory for all at least 20 subjects based on the measurements of relative abundance; and c. output a determined immunological age for the subject.

According to some embodiments, the 3 immune cell populations are selected from the group consisting of: naïve CD8+ T cells, effector CD8+ T cells, CD28– CD8+ T cells, B cells, CXCR5+ CD4+ T cells, CD161– CD45RA+ T regulator cells, naïve CD4+ T cells, CXCR5+ CD8+ T cells, HLADR– CD38+ CD4+ T cells, Th17 CXCR5– CD4+ T cells, T cells, CD85j+ CD8+ T cells, CD57+ CD8+ T cells, Th2 non-TFH CD4+ T cells, PD1+CD8+ T cells, effector memory CD4+ T cells, CD27+ CD8+ T cells, lymphocytes, central memory CD4+ T cells, natural killer (NK) cells, monocytes, Th1 TFH CD4+ T cells, CD8+ T cells, CXCR3– CCR6– CXCR5+ CD8+ T cells, Th2 TFH CD4+ T cells, plasmablasts, and CD94+ NK cells.

According to some embodiments, the 3 immune cell populations are selected from the group consisting of: naïve CD8+ T cells, effector CD8+ T cells, CD28– CD8+ T cells, B cells, CXCR5+ CD4+ T cells, CD161– CD45RA+ T regulator cells, naïve CD4+ T cells, CXCR5+ CD8+ T cells, HLADR– CD38+ CD4+ T cells, Th17 CXCR5– CD4+ T cells, T cells, CD85j+ CD8+ T cells, CD57+ CD8+ T cells, Th2 non-TFH CD4+ T cells, PD1+CD8+ T cells, and effector memory CD4+ T cells.

According to some embodiments, the 3 immune cell populations are selected from the group consisting of: naïve CD8+ T cells, effector CD8+ T cells, CD28– CD8+ T cells, B cells, CXCR5+ CD4+ T cells, CD161– CD45RA+ T regulator cells, naïve CD4+ T cells, CXCR5+ CD8+ T cells, HLADR– CD38+ CD4+ T cells, Th17 CXCR5– CD4+ T cells, and T cells.

According to some embodiments, the measuring a population's abundance comprises measuring abundance of at least one epitope indicative of the immune cell population.

According to some embodiments, the measuring extracellular epitopes is by FACS analysis, wherein a population is gated based on the expression level of the at least one indicative epitope.

According to some embodiments, the comparing comprises employing a distance metric with respect to immune cell population abundance in the sample and samples of the dataset.

According to some embodiments, the comparing comprises selecting from the dataset individuals with a smallest distance with respect to relative abundance of the 3 immune cell populations and averaging an immunological age of the selected individuals.

According to some embodiments, the calculating a trajectory comprises applying a diffusion-pseudotime algorithm to the population relative abundancies.

According to some embodiments, the measuring immune cell relative abundance comprises estimating immune cell relative abundance by measuring gene expression in the blood sample.

According to some embodiments, measuring gene expression in peripheral blood comprises measuring the expression of at least 20 genes selected from the group consisting of: ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, HLA-DOB, AGPAT4, AKAP2, APBB1, ASCL2, C1orf21, C20orf3, CHST12, CST7, CTSW, EEF1B2, ELL3, FAM113B, FAM129C, FCER2, FCGBP, FCRL6, FGFBP2, FLT3LG, GAL3ST4, GPR56, GPR68, GZMH, HOXC4, ID3, LLGL2, LTB, MMP23A, MOBKL2B, MXRA7, MY06, NKG7, NOG, NOSIP, PCYOX1L, PLEKHF1, PMEPA1, RNF157, RPL12, RPL24, RPS10, RPS13, RPS5, SAP30, SESN2, SYTL3, TBX21, TGFBR3, TNFRSF25, TSPAN13, TTC28, YPEL1, ZNF154, ZNF563, ZNF772, ZSCAN18, C2orf89, PATL2, TTC38, PRR5L, SGK223, NCRNA00287, IGHM, HLA-DOA and IGHV5-78.

According to some embodiments, measuring gene expression in peripheral blood comprises measuring the expression of at least 20 genes selected from the group consisting of: ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, and HLA-DOB.

According to some embodiments, the blood sample is a peripheral blood sample.

According to some embodiments, immunological age corresponds to cytokine response score (CRS) with greater accuracy that chronological age, methylation age, or both.

According to some embodiments, the method of the invention further comprises diagnosing the subject with increased risk of illness when the subject's immunological agent age is greater than the subject's chronological age.

According to some embodiments, the method of the invention further comprises diagnosing the subject with a relative increased risk of illness when the subject's immunological age is greater than an immunological age of at least one other subject of the same chronological age.

According to some embodiments, the illness is cardiovascular disease.

According to some embodiments, the increased risk of illness is increased risk of all-cause mortality.

According to some embodiments, the method of the invention further comprises providing to the subject a prophylactic regimen for the illness or more frequent illness-related screening procedures.

According to some embodiments, the determining an immunological age of the subject comprises a method of the invention.

According to some embodiments, the method of the invention further comprises providing the subject with a prophylactic therapy or increased monitoring to decrease the risk of mortality.

According to some embodiments, the detecting molecules are attached to a solid support.

According to some embodiments, the kit comprises at most 100 detecting molecules.

According to some embodiments, the kit of the invention further comprises detecting molecules for detecting at least one control gene unrelated to immunological age or function.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1: Study design. Peripheral blood samples from 135 healthy individuals: 63 young and 72 older adults were collected over the course of 9 years. The snapshot cohort included 18 individuals that were profiled at the end of the 7th year period (2013) by cell subset phenotyping, whereas the entire ongoing cohort was profiled annually for cell subset phenotyping, functional responses of cells to cytokines stimulations, and whole blood gene expression.

FIGS. 2A-D: Individuals' cellular immune profiles exhibit inter-individual variability both at baseline and at their rate of change. PBMC samples of 18 individuals sampled annually over a seven years period used in the snapshot dataset were profiled at high resolution by mass cytometry and manually gated into 73 distinct cell populations. (2A) Individuals vary in their rate of change of naïve CD8+ T-cell over time. Shown are the group-level longitudinal regression line (black line, by mixed-linear model), as well as the individual-level lines of each individual (colored by individual). Shaded area denotes confidence interval. (2B) The frequencies of multiple cell subsets change at different rates (slopes) between older adults. Boxplots show the distribution of individual-level longitudinal slopes of cell subsets' frequencies for 17 immunosenescence associated cell subsets (n=15 older adults. Boxes represent 25th and 75th percentiles around the median (line). Whiskers, 1.5× the inter-quantile range). Group level slopes per cell subset are shown as dots, whereas boxplots' color denotes number of individuals exhibiting a positive individual slope. (2C) Principal component analysis of individuals' cellular profiles using all the cell subset frequencies. The single time points of an individual are colored by an individual's age (in decades) at recruitment with shape denoting CMV serology. Three representative trajectories are shown as bold line connecting the single time-points labeled by visit number and subject ID and are colored and labeled by individual's age decade. (2D) Cell-subsets (dots) are scattered by their correlation significance with the main two principal components (y-axis, P values were calculated using linear-regression followed by Fisher's combination and BH correction, n=18 individuals) and the difference between the Pearson correlation values of their individual-level slopes calculated either against individuals' baseline positions in the PCA space or against age (x-axis). P values threshold of 0.05 is displayed by a horizontal dashed line.

FIGS. 3A-C: The annual change of an immune cell subset frequency depends on baseline levels rather than on age. (3A) 33 cell subsets were found to be consistently correlated with age across 9 years of data (linear models, BH-adjusted combined P<0.05). Cell subsets are ordered by the mean ratio of cellular frequencies between older and young adults with color denoting the percentage of years in which a significant correlation against age was identified. (3B) Analysis pipeline for estimating immune cell subsets' temporal dynamics in the ongoing dataset. Cell subsets' dynamics were estimated by regressing the annual change per cell subset for each two consecutive years (delta) against the individual's age (top) or baseline levels of cellular frequency (median linear regression, bottom). (3C) Correlation between annual change of naïve CD8+ T cells either against age (top) or against baseline frequencies (bottom). Linear regression lines are shown in red.

FIGS. 4A-G: Immune cells' dynamics in older adults yield a convergence on an attractor point. (4A) Some cell subsets exhibit baseline dependent dynamics, enabling inference of an attractor point corresponding to stable frequency on which the system converges, along with a corresponding confidence interval (shaded box). (4B) A generalized model of cell subset dynamics in healthy aging enables classification of cell subsets into three classes that differ in their ordering of reaching the attractor points: slow linear, asymptotic and fluctuating. (4C-E) Annual change-baseline scatter plots along with annual change density distribution plots of three representative cell subsets assigned to the different classes. (4C) CD85j+ CD8+ T cells (Pannual change=3.43-$10^{-8}$), (4D) naïve CD4+ T cells (Pannual change=5.94-$10^{-5}$, Plinear model=5.33.10-7) and (4E) monocytes (Pannual change=0.14) were classified as slow linear, asymptotic and fluctuating, respectively. Dashed light grey and dark grey lines correspond to median abundance in old and young adults, respectively, whereas a solid line and the shaded box correspond to the attractor point and the confidence interval, respectively. (4F) Cell subsets classification along with the median cellular frequencies measured in young (dark grey, n=63 individuals) and older (light grey, n=72 individuals) adults. For the asymptotic cell subsets, attractor point and corresponding confidence interval are marked in black. (4G) Ordering of asymptotic cell subsets modules by their reaching to attractor points' levels. Color represents the first visit in which the cell subset reached the attractor point within an individual. Cell-subsets' assignments into modules appear on top. AP: attractor point.

FIGS. 5A-D: A linear trajectory explains the dynamics of cellular frequencies in healthy aging. (5A) Diffusion maps dimensionality reduction of young (grey) and old (colored by age) individuals calculated using scaled cellular frequencies. Red dashed line denotes longitudinal immune-profiles of one old individual along the trajectory. (5B) Density plots of individual-longitudinal slopes along the trajectory calculated on young (light blue) and old (pink) individuals. Specific examples of longitudinal dynamics along the trajectory of one young individual (left) and two older adults are shown on bottom. (5C) Scaled frequencies of cell-subsets classified as either: slow linear, asymptotic, or fluctuating (left bar) along the pseudotime axis corresponding to the trajectory. Median of scaled frequencies as measured in young individuals are shown in the left bar whereas longitudinal measurements of one older adult appear on top as dashed, red arrows. (5D) Cytokine response score of 2011 samples colored by age and median regression line against pseudotime (quantile regression P=0.028, 0.41 (n=83 cytokine response scores) for pseudotime and age, respectively). Quantile regression lines of the quantiles: 0.25 and 0.75 are shown as dashed lines.

FIGS. 6A-B: IMM-AGE score predicts all-cause mortality risk beyond well-established risk factors. (6A) Kaplan Mayer overall survival curves for Framingham Heart Study participants stratified based on the median values of their IMM-AGE scores adjusted to cardiovascular risk factors and cardiovascular disease. Yellow and blue curves correspond to individuals with low and high IMM-AGE scores, respectively (P=0.018, n=2,290, two-sided log-rank test). (6B) An interaction between age and life history creates an immunological landscape dictating the composition of the cellular immune system.

FIGS. 7A-E: Study demographics and experimental platforms. (7A) A histogram that summarizes the number of visits (years in which immune profiling was conducted) across individuals stratified by age group. (7B) A histogram summarizing the total number of individuals profiled per year. (7C) Age and gender distributions of the individuals profiled per year. (7D) Data types and platforms used for immune-profiling in each year for the snapshot (right column) and ongoing datasets (left columns). (7E) Data types and relevant years of the Stanford University's longitudinal study of aging and vaccination that were analyzed by our study (bottom row) and other studies (top rows). CBC: complete blood count.

FIGS. 8A-D: Snapshot cohort analysis. (8A) Inter-(light grey, n=18 individuals) and intra-(dark grey, n=6 years) individual variation distributions calculated using coefficient of variation per cell subset. Boxes represent 25th and 75th percentiles around the median (line). Whiskers, 1.5× the inter-quantile range. (8B) Percentage of total variance per cell subset explained by inter-individual variation (total sum of squares attributed to subject) and intra-individual variation (residual sum of squares). (8C) The within individual trajectories' lengths in young compared to older adults as measured in the PCA 2-dimensional space (P=0.03, two-tailed t-test, n=3 young and 15 older adults). Boxes represent 25th and 75th percentiles around the median (line). Whiskers, 1.5× the inter-quantile range. (8D) Spearman correlations of individual-level slopes of those cell subsets highly correlated with the first two principal components with age and the individual's baseline position along the PCA 2-dimensional axes (right and left boxplots, respectively, P=1.7.10-4, two-tailed paired t-test, n=39). Boxes represent 25th and 75th percentiles around the median (line). Whiskers, 1.5× the inter-quantile range. *, *** denote P<0.05, 0.001, respectively.

FIGS. 9A-B: Adjustment of the ongoing dataset using young individuals improves its correlation with the snapshot dataset. (9A) Boxplots of representative cell subsets' frequencies in 72 old (light grey) and 63 young (dark grey) adults before (upper panels) and following (lower panels) adjustment by young individuals. Boxes represent 25th and 75th percentiles around the median (line). Whiskers, 1.5× the inter-quantile range. (9B) Individual slopes of the frequencies of 30 immune cell subsets identified as associated with age calculated on the snapshot (left), adjusted ongoing (middle) and non-adjusted ongoing (right) datasets. Adjustment of the ongoing dataset improved the correlation between the slopes measured in the snapshot and ongoing datasets from 0.29 (linear regression P=0.12, n=30) to 0.54 (linear regression P=0.004, n=30). Boxes represent 25th and 75th percentiles around the median (line). Whiskers, 1.5× the inter-quantile range.

FIG. 10: Age poorly affects longitudinal dynamics in cellular frequencies. Scatter plots of the annual change against the individuals' age for each cell subset identified as significantly age-dependent. Blue lines denote linear regression lines.

FIG. 11: Classification scheme of cell subsets based on their dynamics. Cell-subsets identified as significantly age-dependent in a combinatorial analysis across years were filtered based on annual-change data quality. Those cell subsets exhibiting an annual change not significantly different from zero were classified as fluctuating, whereas those exhibiting a significant non-zero annual change were subjected to an additional analysis testing the relation of their annual change with baseline frequencies. Those cell subsets with a non-significant association were classified as linear whereas those exhibiting a significant association were classified as asymptotic and were subjected to three additional tests analyzing the significance of their identified attractor points locations.

FIGS. 12A-C: Three stages of longitudinal dynamics of cell subsets' frequencies are captured in the ongoing dataset. (12A) Scatter plots of the annual change against the baseline frequencies for those cell subsets classified as asymptotic. Horizontal and diagonal lines correspond to linear regression lines. Vertical lines correspond to attractor point (AP) frequencies and median frequency in young (YM) and older (OM) adults. Confidence intervals for the attractor points are delimited by grey dashed lines. (12B) Scatter plots of the annual change against the baseline frequencies for those cell subsets classified as slow linear. Median frequency in young (YM) and older (OM) adults, are presented. (12C) Scatter plots of the annual change against the baseline frequencies for those cell subsets classified as fluctuating. Lines denote median frequency in young (YM) and older (OM) adults.

FIGS. 13A-D: Inherent correlations between cell subsets. Boxplots denote the ages at which cell subsets reached their corresponding attractor points frequencies stratified either by (13A) cell subset (median interquartile range of 14.75 years; naïve CD8+ T cells were excluded as most individuals did not reach the attractor point frequencies; n=72 individuals) or by (13B) individuals (median interquartile range of 2 years; n=10 cell subsets). Boxes represent 25th and 75th percentiles around the median (line). Whiskers, 1.5× the inter-quantile range. (13C) A scheme describing longitudinal correlations calculated between every pair of cell-subsets. (13D) Longitudinal pairwise spearman correlations between cell subsets are shown as circle's color whereas circle's size corresponds to p value (calculated by permutations; only P<0.05 are shown; n=69 older adults).

FIGS. 14A-E: A linear trajectory explains the dynamics of cellular frequencies in healthy aging. (14A) Annual change in pseudotime calculated on young (two-tailed Binomial test P=0.648, n=77) and old (two-tailed Binomial test P=0.0018, n=210) individuals. Boxes represent 25th and 75th percentiles around the median (line). Whiskers, 1.5× the inter-quantile range. (14B) Linear-model derived significance levels (n=294 samples, calculated as-log P) of cellular frequencies that were regressed either against age (x-axis) or pseudotime (y-axis). Each dot denotes a cell subset with shape corresponding to the direction of young-old differences and color corresponding to the cell subset's classification. A=asymptotic, L=slow linear, fluctuating is not labeled. Dashed line is the y=x line. (14C) Scaled frequencies of cell-subsets classified as either: asymptotic, slow linear or fluctuating (left bar) along the age axis. Median of scaled frequencies calculated using the young individuals are shown in the left bar. (14D) Cytokine response score of 2012 samples colored by age and median regression line against pseudotime (quantile regression P=0.021, 0.77 (n=17) for pseudotime and age, respectively). Quantile regression lines of the quantiles: 0.25 and 0.75 are shown as dashed lines. (14E) Scaled individual phospho-flow cytokine responses measured in the years: 2011-2012 in individuals positioned in either half of the trajectory as divided by the median (n=28, 6 in each group for 2011 and 2012, respectively). Dots and error bars correspond to median values and standard deviations respectively.

FIGS. 15A-B: Identification of a gene-set whose expression correlates with IMM-AGE. (15A) Scaled gene-expression by individuals ordered based on their IMM-AGE scores for those genes identified as consistently changing along the trajectory. Information about individuals' IMM-AGE, age and year appears on top. (15B) Difference between number of up- and down-regulated genes of the identified gene-set expressed by different cell types in the DMAP dataset. Only those cells types exhibiting a significant enrichment either for up- or down-regulated genes are displayed.

FIGS. 16A-E: Clinical associations of IMM-AGE scores in the Framingham Heart Study data-set. (16A) Expression levels of those genes used for IMM-AGE approximation in the gene-expression samples of the Framingham Heart Study participants ordered by the approximated IMM-AGE scores. (16B) Correlation of the estimated IMM-AGE scores with age and gender (linear-regression P=7.10$^{-63}$, 7.22.10$^{-27}$ (n=2,292) for age and gender, respectively). Points correspond to individuals whose color denotes gender. (16C) Age- and gender-adjusted IMM-AGE score of individuals stratified based on cardiovascular disease (dots), where bold lines denote mean values (P=0.0023, n=2,292, two-tailed t test). (16D) IMM-AGE score association with cardiovascular risk factors as obtained by linear regression. Bars' colors denote positive (light grey) or negative (dark grey) associations. (16E) Linear regression of IMM-AGE against DNA methylation age, where both were adjusted to cardiovascular risk-factors and cardiovascular disease (n=2,139 individuals). ** denotes P<0.01; CVD: cardiovascular disease.

FIG. 17: Dot plot of the correlation of pseudotime scores by number of cell subsets measured.

FIGS. 18A-B: A subset of 20 genes is sufficient to reliably reproduce pseudotime values in the Ellison dataset. (18A) Random sampling of differential number of genes (upper panels) from the original genomic signature yields high (>0.7) correlations with pseudotime values derived from cellular frequencies. (18B) Stepwise selection of genes (x-axis) to maximize correlation with the original cellular-frequency derived pseudotime values.

FIG. 19: Table of data related to the slope of each cell population.

DETAILED DESCRIPTION OF THE INVENTION

The present invention, in some embodiments, provides methods of determining immunological age of a subject. The present invention further concerns a method of diagnosing increased risk of illness and mortality in a subject. Kits and computer program products for performing the methods of the invention are also provided.

The invention is based on the surprising finding that a subject's immunological age can be quite different than that subject's chronological age, and that an advanced immunological age as compared to other same aged individuals correlates with illness and mortality. The inventors further discovered that not all immune cell populations age in the same manner. Immune populations seem to age in one of three ways. The first, and most informative is an asymptotic aging curve in which the population percentage is moving towards an attractor point at a yet to come older age. These cell populations are the most informative it terms of assigning an immunological age to a subject. The second type of population is changing linearly and is also informative for the methods of the invention. The last type of population fluctuates around an already achieved equilibrium. These cells may have already reached an attractor point at a younger age that was examined by the inventors. These cells are the least informative for immunological age calculation.

Herein the inventors used multiple 'omics' technologies in a cohort of over one hundred adults of different ages that were sampled longitudinally over the course of nine years to comprehensively capture population- and individual-level changes in the immune-system over time. Using dynamical systems tools, the inventors identified cell-subset dynamics that lead towards a high-dimensional attractor point, namely: a novel homeostasis of older adults. They showed that the cellular immune profiles of the cohort are distributed throughout a continuous trajectory along which older adults' immune-systems change over time, dictating an immunological age metric that predicts overall survival independently of age, gender and cardiovascular disease.

By a first aspect, there is provided a method of determining the immunological age of a subject, the method comprising:
  a. measuring the relative abundance of an immune cell population in a blood sample from the subject; and
  b. comparing the measurement of relative abundance of the immune cell population to a dataset of measurements of immune cell population relative abundance in subject with predetermined immunological ages, thereby determining the immunological age of the subject.

By another aspect, there is provided a method of determining the immunological age of a subject, the method comprising:
  a. measuring the relative abundance of an immune cell population in a blood sample from the subject; and
  b. combining the measurement of relative abundance of the immune cell population with data of measurements of relative abundances from other subjects to produce a database; and
  c. calculating from the database a trajectory for all subjects based on the measurements;
thereby determining the immunological age of the subject.

As used herein, the term "immunological age" refers to the approximate age of a subject's immune system. In some embodiments, immunological age is predictive of future incidence of illness. In some embodiments, immunological age is predictive of future mortality. In some embodiments, immunological age is predictive of cytokine response score (CRS). In some embodiments, immunological age corresponds to CRS. In some embodiments, immunological age is more predictive and/or corresponding than chronological age. In some embodiments, immunological age is more predictive and/or corresponding than methylation age. In some embodiments, immunological age is at least 5, 10, 20, 25, 30, 40, 50, 60, 70, 75, 80, 90, 95, 100, 150, 200, 250, 300, 400, 500, 600, 700, 750, 800, 900, or 1000% more predictive. Each possibility represents a separate embodiment of the invention. In some embodiments, greater predictivity is greater accuracy.

In some embodiments, immunological age is a relative measure. In some embodiments, immunological age is an absolute measure. In some embodiments, immunological age is as compared to the immunological age of another individual of the same chronological age. In some embodiments, immunological age is as compared to the immunological age of another individual of the same methylation age. In some embodiments, immunological age is as compared to the subject's actual chronological age. In some embodiments, determining immunological age is estimating immunological age. In some embodiments, determining immunological age is determining approximate immunological age.

In some embodiments, the subject is a mammal. In some embodiments, the subject is a human. In some embodiments, the subject is a veterinary animal. In some embodiments, the subject is in need of determining its immunological age. In some embodiments, the subject is elderly. In some embodiments, elderly is at least 30, 35, 40, 45, 50, 55, 60, 65, 70, 76, 80, 85 or 90 years old. Each possibility represents a separate embodiment of the invention. In some embodiments, the subject is at least 40 years old. In some embodiments, the subject is at least 60 years old. In some embodiments, the subject is at risk for developing an illness. In some embodiments, the illness is cardiovascular disease. In some embodiments, the illness is death. In some embodiments, the death is all cause mortality. In some embodiments, the subject is healthy. In some embodiments, the subject is ill. In some embodiments, the subject is at risk of a compromised immune system.

In some embodiments, at least 1, 2, 3, 4, 5, 6, 7, 8, 9, 10, 12, 14, 15, 16, 18, 20, 22 or 24 immune cell populations are measured. Each possibility represents a separate embodiment of the invention. In some embodiments, at least 5 immune cell populations are measured. In some embodiments, at least 3 immune cell populations are measured. In some embodiments, all immune cell populations described herein are measured. In some embodiments, the populations are measured simultaneously. In some embodiments, the populations are measured separately. In some embodiments, total cell numbers are measured. In some embodiments, relative abundance is measured. In some embodiments, relative abundance is frequency. In some embodiments, frequency is relative frequency. In some embodiments, the percentage of each population in the blood sample is calculated. In some embodiments, measurements are at a single time point. In some embodiments, measurements are at more than one time point. In some embodiments, measurements are at at least 1, 2, 3, 4, 5, 6, or 7 time points. Each possibility represents a separate embodiment of the invention. In some embodiments, the time points are separated by at least 1, 2, 3, 4, 5, 6, 7, 8, 9, 10, 11 or 12 months. Each possibility represents a separate embodiment of the invention.

As used herein, an "immune cell" refers to any cell of the immune system. In some embodiments, the immune cell is a hematopoietic cell. In some embodiments, the immune cell population is selected from the group consisting of: naïve CD8+ T cells, effector CD8+ T cells, CD28– CD8+ T cells, B cells, CXCR5+ CD4+ T cells, CD161– CD45RA+ T regulator cells, naïve CD4+ T cells, CXCR5+ CD8+ T cells, HLADR– CD38+ CD4+ T cells, Th17 CXCR5– CD4+ T cells, T cells, CD85j+ CD8+ T cells, CD57+ CD8+ T cells, Th2 non-TFH CD4+ T cells, PD1+ CD8+ T cells, effector memory CD4+ T cells, CD27+ CD8+ T cells, lymphocytes, central memory CD4+ T cells, natural killer (NK) cells, monocytes, Th1 TFH CD4+ T cells, CD8+ T cells, CXCR3– CCR6– CXCR5+ CD8+ T cells, Th2 TFH CD4+ T cells, plasmablasts, and CD94+ NK cells. In some embodiments, the immune cell population is a population with an asymptotic and/or linear trajectory. In some embodiments, the immune cell population is selected from the group consisting of: naïve CD8+ T cells, effector CD8+ T cells, CD28– CD8+ T cells, B cells, CXCR5+ CD4+ T cells, CD161– CD45RA+ T regulator cells, naïve CD4+ T cells, CXCR5+ CD8+ T cells, HLADR– CD38+CD4+ T cells, Th17 CXCR5– CD4+ T cells, T cells, CD85j+ CD8+ T cells, CD57+ CD8+ T cells, Th2 non-TFH CD4+ T cells, PD1+ CD8+ T cells, and effector memory CD4+ T cells. In some embodiments, the immune cell population is a population with an asymptotic trajectory. In some embodiments, the population is selected from the group consisting of: naïve CD8+ T cells, effector CD8+ T cells, CD28– CD8+ T cells, B cells, CXCR5+ CD4+ T cells, CD161– CD45RA+ T regulator cells, naïve CD4+ T cells, CXCR5+ CD8+ T cells, HLADR– CD38+ CD4+ T cells, Th17 CXCR5– CD4+ T cells, and T cells. In some embodiments, the population with asymptotic trajectory is selected from the group consisting of: naïve CD8+ T cells, effector CD8+ T cells, CD28– CD8+ T cells, B cells, CXCR5+ CD4+ T cells, CD161– CD45RA+ T regulator cells, naïve CD4+ T cells, CXCR5+CD8+ T cells, HLADR– CD38+ CD4+ T cells, Th17 CXCR5– CD4+ T cells, and T cells. In some embodiments, the population with linear trajectory is selected from the group consisting of: CD85j+ CD8+ T cells, CD57+ CD8+ T cells, Th2 non-TFH CD4+ T cells, PD1+ CD8+ T cells, and effector memory CD4+ T cells. In some embodiments, the population with fluctuating trajectory is selected from the group consisting of: CD27+ CD8+ T cells, lymphocytes, central memory CD4+ T cells, natural killer (NK) cells, monocytes, Th1 TFH CD4+ T cells, CD8+ T cells, CXCR3– CCR6– CXCR5+ CD8+ T cells, Th2 TFH CD4+ T cells, plasmablasts, and CD94+ NK cells.

By another aspect, there is provided a method of determining the relative abundance of immune cell populations in blood from a subject, the method comprising providing a blood sample from the subject and measuring the number of cells present from at least 3 immune cell populations, wherein the immune cell populations are selected from: naïve CD8+ T cells, effector CD8+ T cells, CD28− CD8+ T cells, B cells, CXCR5+ CD4+ T cells, CD161− CD45RA+ T regulator cells, naïve CD4+ T cells, CXCR5+ CD8+ T cells, HLADR-CD38+ CD4+ T cells, Th17 CXCR5− CD4+ T cells, T cells, CD85j+ CD8+ T cells, CD57+CD8+ T cells, Th2 non-TFH CD4+ T cells, PD1+ CD8+ T cells, effector memory CD4+ T cells, CD27+ CD8+ T cells, lymphocytes, central memory CD4+ T cells, natural killer (NK) cells, monocytes, Th1 TFH CD4+ T cells, CD8+ T cells, CXCR3− CCR6− CXCR5+ CD8+T cells, Th2 TFH CD4+ T cells, plasmablasts, and CD94+ NK cells, thereby determining the relative abundance of immune cell populations in blood from a subject.

In some embodiments, the method is for determining the relative abundance of at least 1, 2, 3, 4, 5, 6, 7, 8, 9, 10, 12, 14, 15, 16, 18, 20, 22 or 24 immune cell populations. Each possibility represents a separate embodiment of the invention. In some embodiments, at least 1, 2, 3, 4, 5, 6, 7, 8, 9, 10, 12, 14, 15, 16, 18, 20, 22 or 24 immune cell populations are measured. Each possibility represents a separate embodiment of the invention. In some embodiments, at least 5 immune cell populations are measured. In some embodiments, at least 3 immune cell populations are measured. In some embodiments, the immune cell populations are populations with an asymptotic and/or linear trajectory. In some embodiments, the immune cell populations are selected from the group consisting of: naïve CD8+ T cells, effector CD8+ T cells, CD28− CD8+ T cells, B cells, CXCR5+ CD4+ T cells, CD161− CD45RA+ T regulator cells, naïve CD4+ T cells, CXCR5+ CD8+ T cells, HLADR-CD38+ CD4+ T cells, Th17 CXCR5− CD4+ T cells, T cells, CD85j+ CD8+ T cells, CD57+CD8+ T cells, Th2 non-TFH CD4+ T cells, PD1+ CD8+ T cells, and effector memory CD4+ T cells. In some embodiments, the immune cell populations are populations with an asymptotic trajectory. In some embodiments, the populations are selected from the group consisting of: naïve CD8+ T cells, effector CD8+ T cells, CD28− CD8+ T cells, B cells, CXCR5+ CD4+ T cells, CD161− CD45RA+ T regulator cells, naïve CD4+ T cells, CXCR5+CD8+ T cells, HLADR− CD38+ CD4+ T cells, Th17 CXCR5− CD4+ T cells, and T cells.

In some embodiments, a population is identified by expression of at least one epitope that identifies the population. In some embodiments, the expression is surface expression. In some embodiments, the expression is intracellular expression. In some embodiments, the epitope is an immune cell marker. Immune cell markers are well known in the art and any marker or markers than can uniquely and/or unambiguously identify the population may be used. In some embodiments, measuring a population's abundance comprises measuring abundance of at least one epitope indicative of the immune cell population. In some embodiments, the measuring is on a single cell level. In some embodiments, the measuring comprises extracting cells from the blood sample. In some embodiments, the measuring comprises contacting the cells blood sample with an agent that binds to at least one epitope that is indicative of and/or identifies the population. In some embodiments, the epitope is an extracellular epitope. In some embodiments, the epitope is an intracellular epitope. In some embodiments, the protein is a protein. In some embodiments, the protein is a surface protein. In some embodiments, the agent is an antibody to the epitope. In some embodiments, the agent is conjugated to a detectable moiety and the measuring comprises measuring the moiety. In some embodiments, the measuring comprises immunodetection. In some embodiments, the immunodetection is flow cytometry. In some embodiments, the flow cytometry is fluorescence activated cell sorting (FACS). In some embodiments, the immunodetection is single-cell mass cytometry analysis (CyTOF). In some embodiments, the measuring comprises CyTOF. In some embodiments, a population is gated based on expression of at least one indicative epitope. In some embodiments, more than one population are gated in the same measuring and relative abundance is measured. In some embodiments, the immunodetection is immunostaining. In some embodiments, the detectable moiety is a fluorescent moiety. In some embodiments, the measuring comprises cell counting. Any methods of population detection, such as but not limited as are described herein, may be employed for the methods of the invention. Examples of antibodies that can be used for measuring can be found in Alpert et al., 2019, *A clinically meaningful metric of immune age derived from high-dimensional longitudinal monitoring*, Nature Medicine, 25:387-495, herein incorporated by reference in its entirety.

In some embodiments, the measuring is in blood of the subject. In some embodiments, the blood is a blood sample. In some embodiments, the blood is peripheral blood. In some embodiments, the relative abundance in peripheral blood is measured. In some embodiments, the measuring is performed ex vivo. In some embodiments, the measuring is performed in vitro. In some embodiments, the sample is a routine blood sample. In some embodiments, cells are isolated from the blood sample. In some embodiments, the relative abundance is measured in the blood. In some embodiments, nom-immune cells are removed before the measuring. In some embodiments, the non-immune cells are blood cells. In some embodiments, the blood cells are selected from red blood cells and platelets. In some embodiments, non-immune cells are left in the sample, but not included in the measuring. In some embodiments, the non-immune cells are gated out of the measuring.

In some embodiments, the measurements of relative abundance of a population is compared to the relative abundance of that population in subjects with a known and/or predetermined immunological age. In some embodiments, all measured populations are compared to the relative abundance of those populations in subjects with known and/or predetermined immunological age. In some embodiments, the comparison is to dataset of measurements from subjects with known and/or predestined immunological age. In some embodiments, the subjects in the dataset have known immunological ages. In some embodiments, the subjects in the dataset have predetermined immunological ages. In some embodiments, the dataset comprises data from at least 20, 30, 40, 50, 60, 70, 80, 90 or 100 subjects. Each possibility represents a separate embodiment of the invention. In some embodiments, the dataset comprises data from at least 100 subjects. In some embodiments, the In some embodiments, the comparing comprises employing a distance metric. In some embodiments, the distance metric is with respect to population abundance in the sample and in the subjects in the dataset. In some embodiments, the distance metric determines the subject and/or subjects from the dataset with the closest relative abundances. In some embodiments, the immunological age of the subject or subjects from the dataset with the shortest distance from the measured subject's data is the determined immunological age of the subject. In some embodiments, the trajectory is along a temporal axis. In some embodiments, the subjects in the dataset are placed along a temporal axis of immunological age and the distance metric provides the location on the axis that is the shortest distance from the subject, thereby determining the subject's immunological age. In some embodiments, the distance metric is applied to each population separately. In some embodiments, the distance metric is applied to all populations simultaneously.

In some embodiments, comparing comprises selecting from the dataset individuals with relative population abundancies similar to the measured subject and averaging the immunological age of the selected individuals. In some embodiments, similar comprises a difference of less than 0.5, 1, 1.5, 2, 2.5, 3, 4, 5, 6, 7, 8, 9, 10, 11, 12, 13, 14, 15, 20, 25, 30, 35, 40, 45, or 50%. Each possibility represents a separate embodiment of the invention. In some embodiments, similar comprises the 1, 2, 3, 4, 5, 6, 7, 8, 9, 10, 12, 15, 20, 25, 30, 35, 40, 45 or 50 individuals with the most minimal distance based from the subject. In some embodiments, the most minimally distant individuals are determined by the distance metric. In some embodiments, the similar individuals are the least distant with respect to the relative abundance of the measured immune cell populations. In some embodiments, the differences from each population are summed to determine similarity. In some embodiments, each population must be below a predetermined threshold for a subject to be considered similar. In some embodiments, the predetermined threshold is a difference of less than 0.5, 1, 1.5, 2, 2.5, 3, 4, 5, 6, 7, 8, 9, 10, 11, 12, 13, 14, 15, 20, 25, 30, 35, 40, 45, or 50%. Each possibility represents a separate embodiment of the invention. In some embodiments, the geometric mean of the similar subject's immunological ages is the immunological age of the measured subject. In some embodiments, the arithmetic mean of the similar subject's immunological ages is the immunological age of the measured subject.

In some embodiments, the measurements from the subject are combined with measurements from other subjects to produce a database. In some embodiments, the subject's measurements are combined with data from at least 1, 2, 3, 4, 5, 6, 7, 8, 9, 10, 11, 121, 13, 14, 15, 16, 17, 18, 19, 20, 24, 25, 29, 30, 34, 35, 39, 40, 44, 45, 49 or 50 other subjects. Each possibility represents a separate embodiment of the invention. In some embodiments, the subject's measurements are combined with data from at least 19 other subjects. In some embodiments, the other subjects are of different ages. In some embodiments, the subjects in the dataset span ages of at least 5, 10, 15, 20, 25, 30, 35, 40, 45, or 50 years. Each possibility represents a separate embodiment of the invention. In some embodiments, the other subjects were measured concomitantly to the subject. In some embodiments, the other subjects were measured concomitantly to each other. In some embodiments, the database is used to determine the immunological age of the subject and the other subjects in the database. In some embodiments, the method of determining the immunological age of the subjects in the database is as described herein below for the cohort of 135 individuals.

In some embodiments, a trajectory for each population's relative abundance is calculated from the measurements in the database. In some embodiments, the trajectory is calculated from the database of measurements. In some embodiments, the trajectory is calculated for all subject. In some embodiments, for all 20 subjects. In some embodiments, for the measured subject and the other subjects combined. In some embodiments, the trajectory is calculated based on the measurements of relative abundance. In some embodiments, the trajectory is calculated for each subject. In some embodiments, the trajectory is calculated for each population. In some embodiments, the trajectory is calculated for all populations together. In some embodiments, the trajectory is selected from asymptotic, linear or fluctuating. In some embodiments, the trajectory is calculated with measurements at different chronological ages. In some embodiments, the trajectory is calculated with measurements that span at least 5 years of chronological age. In some embodiments, the trajectory indicates which populations are to be used for calculating immunological age. In some embodiments, the trajectory is calculated along a temporal axis. In some embodiments, the trajectory indicates the immunological age of a given relative abundance of a population. In some embodiments, calculating a trajectory comprises applying a dimensionality reduction methodology to the population relative abundances. In some embodiments, the dimensionality reduction methodology is a diffusion-pseudotime algorithm. In some embodiments, the dimensionality reduction methodology is principal component analysis. In some embodiments, positioning of the subject along the temporal axis indicates the subjects immunological age. In some embodiments, the subject is positioned along the axis to determine immunological age. In some embodiments, generation of the trajectory by default places the subject along the axis.

By another aspect, there is provided a method of determining the immunological age of a subject, the method comprising:
 a. measuring gene expression in a blood sample from the subject; and
 b. comparing the measured gene expression to a dataset of measurements of gene expression in subject with predetermined immunological ages, thereby determining the immunological age of the subject.

By another aspect, there is provided a method of determining the immunological age of a subject, the method comprising:
 a. measuring gene expression in a blood sample from the subject; and
 b. combining the measured gene expression with data of measurements of gene expression from other subjects to produce a database; and
 c. calculating from the database a trajectory for all subjects based on the measurements;
thereby determining the immunological age of the subject.

In some embodiments, measuring relative immune cell abundance comprises estimating immune cell relative abundance. In some embodiments, estimating comprises measuring gene expression in the blood sample. In some embodiments, estimating comprises measuring enrichment of a gene signature. In some embodiments, measuring gene expression comprises measuring a gene signature. In some embodiments, measuring a gene signature is measuring enrichment of a gene signature. In some embodiments, the gene signature is a signature of immunological age. In some embodiments, gene expression is correlated to relative population abundance. In some embodiments, gene expression is correlated to immunological age. In some embodiments, gene expression from a limited number of genes can estimate relative abundance of the immune cell populations of the invention. In some embodiments, gene expression from a limited number of genes correlates to immunological age. In some embodiments, the gene expression is for at least 1 gene selected from the group consisting of: ABLIM1, AFF3, BACH2, BCL11A, BIRC3, BLNK, BTLA, C1orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, HLA-DOB, AGPAT4, AKAP2, APBB1, ASCL2, C1orf21, C20orf3, CHST12, CST7, CTSW, EEF1B2, ELL3, FAM113B, FAM129C, FCER2, FCGBP, FCRL6, FGFBP2, FLT3LG, GAL3ST4, GPR56, GPR68, GZMH, HOXC4, ID3, LLGL2, LTB, MMP23A, MOBKL2B, MXRA7, MY06, NKG7, NOG, NOSIP, PCYOX1L, PLEKHF1, PMEPA1, RNF157, RPL12, RPL24, RPS10, RPS13, RPS5, SAP30, SESN2, SYTL3, TBX21, TGFBR3, TNFRSF25, TSPAN13, TTC28, YPEL1, ZNF154, ZNF563, ZNF772, ZSCAN18, C2orf89, PATL2, TTC38, PRR5L, SGK223, NCRNA00287, IGHM, HLA-DOA and IGHV5-78. In some embodiments, the gene expression is for at least 1 gene selected from the group consisting of: ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, and HLA-DOB.

By another aspect, there is provided a method of determining the relative abundance of immune cell populations in blood from a subject, the method comprising providing a blood sample from the subject and measuring expression levels of at least 1 gene selected from the group consisting of: ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, HLA-DOB, AGPAT4, AKAP2, APBB1, ASCL2, C1orf21, C20orf3, CHST12, CST7, CTSW, EEF1B2, ELL3, FAM113B, FAM129C, FCER2, FCGBP, FCRL6, FGFBP2, FLT3LG, GAL3ST4, GPR56, GPR68, GZMH, HOXC4, ID3, LLGL2, LTB, MMP23A, MOBKL2B, MXRA7, MY06, NKG7, NOG, NOSIP, PCYOX1L, PLEKHF1, PMEPA1, RNF157, RPL12, RPL24, RPS10, RPS13, RPS5, SAP30, SESN2, SYTL3, TBX21, TGFBR3, TNFRSF25, TSPAN13, TTC28, YPEL1, ZNF154, ZNF563, ZNF772, ZSCAN18, C2orf89, PATL2, TTC38, PRR5L, SGK223, NCRNA00287, IGHM, HLA-DOA and IGHV5-78.

In some embodiments, the at least 1 gene is selected form the group consisting of: ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, and HLA-DOB. In some embodiments, ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, HLA-DOB, AGPAT4, AKAP2, APBB1, ASCL2, C1orf21, C20orf3, CHST12, CST7, CTSW, EEF1B2, ELL3, FAM113B, FAM129C, FCER2, FCGBP, FCRL6, FGFBP2, FLT3LG, GAL3ST4, GPR56, GPR68, GZMH, HOXC4, ID3, LLGL2, LTB, MMP23A, MOBKL2B, MXRA7, MY06, NKG7, NOG, NOSIP, PCYOX1L, PLEKHF1, PMEPA1, RNF157, RPL12, RPL24, RPS10, RPS13, RPS5, SAP30, SESN2, SYTL3, TBX21, TGFBR3, TNFRSF25, TSPAN13, TTC28, YPEL1, ZNF154, ZNF563, ZNF772, ZSCAN18, C2orf89, PATL2, TTC38, PRR5L, SGK223, NCRNA00287, IGHM, HLA-DOA, IGHV5-78 or any combination thereof is measured. In some embodiments, ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, HLA-DOB or any combination thereof is measured.

In some embodiments, at least 1, 2, 3, 4, 5, 6, 7, 8, 9, 10, 11, 12, 13, 14, 15, 20, 25, 30, 40, 45, 50, 55, 57, 60, 65, 70, 75, 80, 85, 90, 95, 100, 105, 110, 115, 120 or 121 genes are measured. Each possibility represents a separate embodiment of the invention. In some embodiments, at least 20 genes are measured. In some embodiments the genes are genes that change along an aging trajectory. In some embodiments, a trajectory is calculated using the gene expression measurements. In some embodiments, correlating gene expression to population relative abundance comprises gene-set enrichment projection (GSEA). In some embodiments, the GSEA is single-GSEA (ssGSEA). In some embodiments, correlating gene expression to immunological age comprises GSEA. In some embodiments, the enrichment scores are used as an approximation of immunological age.

In some embodiments, a method of the invention further comprises making a prognostication on the subject's future health based on the subject's immunological age. In some embodiments, a higher than expected immunological age is indicative of poor future health. In some embodiments, a lower than expected immunological age is indicative of good future health. In some embodiments, the expected immunological age is the subject's chronological age. In some embodiments, the expected immunological age is the average immunological age of a group of control subjects of the same chronological age as the subject. In some embodiments, the control group comprises at least 1, 2, 3, 4, 5, 6, 7, 8, 9, or 10 subjects. Each possibility represents a separate embodiment of the invention. In some embodiments, expected immunological age is the immunological age of at least one other subject of the same chronological age as the subject. In some embodiments, the at least one other subject is at least 1, 2, 3, 4, 5, 6, 7, 8, 9, or 10 subjects. Each possibility represents a separate embodiment of the invention. In some embodiments, the average of the immunological ages of the at least one other subject is the expected immunological age. In some embodiments, higher than expected is greater than the subject chronological age. In some embodiments, higher than expected is greater than a control group or at least one other subject of the same chronological age. In some embodiments, the control group is the same chronological age as the subject. In some embodiments, the control group is the same as the subject by a particular biological measure. In some embodiments, the other subjects are the same as the subject by a particular biological measure. In some embodiments, the biological measure is selected from age, sex, CMV status, overall health, ethnicity, methylation age and health history. In some embodiments, the biological measure is sex.

In some embodiments, prognosticating future health comprises diagnosing the subject with an increased risk of illness when the subject's immunological age is greater than expected. In some embodiments, the increased risk is relative increased risk as compared to the control group of the at least one other subject. In some embodiments, the illness is cardiovascular disease. In some embodiments, the illness is an immune related illness. In some embodiments, the illness is an illness that is perturbed or prevented by a healthy immune system. In some embodiments, the illness is selected from cancer, cardiovascular disease, neurological disease, metabolic disease, infectious disease and musculoskeletal disease. In some embodiments, the cancer is an immune checkpoint treatable cancer. In some embodiments, the infectious disease is a bacterial, viral or fungal disease. In some embodiments, the neurological disease is selected from Huntington's disease, Alzheimer's disease, dementia and Parkinson's disease. In some embodiments, the illness is death. In some embodiments, death is all-cause mortality. In some embodiments, immunological age higher than expected indicates an increased risk of death before others of an expected immunological age.

In some embodiments, the method further comprises providing to the subject a prophylactic regimen for the illness. In some embodiments, the prophylactic regimen is a prophylactic treatment. In some embodiments, the method further comprises providing to the subject a prophylactic regimen for the poor health. In some embodiments, the prophylactic treatment is a medication. In some embodiments, the prophylactic regimen is a diet. In some embodiments, the prophylactic regimen is an exercise regimen. In some embodiments, the prophylactic regimen is a recommendation for an alteration in lifestyle. In some embodiments, the alteration in lifestyle is an alteration in diet. In some embodiments, the alteration in lifestyle is an alteration in exercising. In some embodiments, the medication is a cardiovascular medication. Examples of cardiovascular medications include, but are not limited to statins, aspirin, anticoagulants, antiplatelet agents, angiotensin receptor blockers, beta blockers, calcium channel blockers, diuretics and vasodilators.

In some embodiments, the method further comprises providing the subject with an illness-related screening procedure. In some embodiments, increased illness-related screenings are provided. In some embodiments, the screening is increased screening. In some embodiments, the method further comprises provided the subject with increased health screenings. In some embodiments, health screening are general health screenings. In some embodiments, screenings are continued until the subject develops the illness or dies. In some embodiments, the illness-related screenings are provided in combination with prophylactic treatment. In some embodiments, the screening are routine checkups. In some embodiments, the screening is illness specific. Screening procedures are well known in the art, and examples include, but are not limited, to triglyceride measurements, weight measurement, BMI measurement and blood pressure readings for heart disease, mammograms for breast cancer, pap smears for cervical cancer, blood sugar tests for diabetes, cognitive exams for neurological disorders, blood panels and regular doctor visits for general health screening.

By another aspect, there is provided a method of diagnosing increased risk of mortality in a subject, the method comprising:
 a. determining an immunological age of the subject; and
 b. comparing the subject's immunological age to the subject's expected immunological age;
    wherein an immunological age greater than the expected age indicates the subject is at increased risk of mortality;
thereby diagnosing an increased risk of mortality in a subject.

In some embodiments, the comparing is comparing the subject's immunological age to the subject's chronological age. In some embodiments, the comparing is comparing the subject's immunological age to an immunological age of at least one other subject of the same chronological age. In some embodiments, the comparing is comparing the subject's immunological age to the average of the immunological ages of a control group for the subject. In some embodiments, the control group is the same chronological age as the subject.

In some embodiments, the method further comprises providing to the subject a regimen to decrease mortality. In some embodiments, the mortality is all cause mortality. In some embodiments, the regimen comprises a prophylactic treatment. In some embodiments, the regimen comprises an alteration in lifestyle. In some embodiments, the regimen comprises increased screening.

In some embodiments, the determining immunological age of the subject comprises a method of the invention. In some embodiments, the determining immunological age of the subject consists of a method of the invention.

By another aspect, there is provided a kit comprising at least one detecting molecule for determining the number of immune cells of an immune population in a biological sample.

In some embodiments, the at least one detecting molecule is for determining the relative abundance of immune cells of an immune population. In some embodiments, the kit comprises detecting molecules for detecting immune cells of at least 1, 2, 3, 4, 5, 6, 7, 8, 9, 10, 12, 14, 15, 16, 18, 20, 22 or 24 immune cell populations. Each possibility represents a separate embodiment of the invention. In some embodiments, the immune cell population is selected form the populations described hereinabove. In some embodiments, the immune cell populations are immune cell populations with an asymptotic trajectory. In some embodiments, the immune cell populations are immune cell populations with an asymptotic and/or linear trajectory. In some embodiments, the immune cell populations are immune cell populations with an asymptotic, linear or fluctuating trajectory.

By another aspect, there is provided a kit comprising at least one detecting molecule specific for determining the expression level of at least one gene indicative of a relative abundance of an immune population in a biological sample.

In some embodiments, an indicative gene is selected from the group consisting of ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, HLA-DOB, AGPAT4, AKAP2, APBB1, ASCL2, C1orf21, C20orf3, CHST12, CST7, CTSW, EEF1B2, ELL3, FAM113B, FAM129C, FCER2, FCGBP, FCRL6, FGFBP2, FLT3LG, GAL3ST4, GPR56, GPR68, GZMH, HOXC4, ID3, LLGL2, LTB, MMP23A, MOBKL2B, MXRA7, MY06, NKG7, NOG, NOSIP, PCYOX1L, PLEKHF1, PMEPA1, RNF157, RPL12, RPL24, RPS10, RPS13, RPS5, SAP30, SESN2, SYTL3, TBX21, TGFBR3, TNFRSF25, TSPAN13, TTC28, YPEL1, ZNF154, ZNF563, ZNF772, ZSCAN18, C2orf89, PATL2, TTC38, PRR5L, SGK223, NCRNA00287, IGHM, HLA-DOA and IGHV5-78. In some embodiments, an indicative gene is selected from the group consisting of ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, and HLA-DOB.

In some embodiments, the kit comprises detecting molecules for determining the expression level of at least 1, 2, 3, 4, 5, 6, 7, 8, 9, 10, 11, 12, 13, 14, 15, 20, 25, 30, 40, 45, 50, 55, 57, 60, 65, 70, 75, 80, 85, 90, 95, 100, 105, 110, 115, 120 or 121 genes. Each possibility represents a separate embodiment of the invention. In some embodiments, the kit comprises detecting molecules for determining the expression level of at most 5, 6, 7, 8, 9, 10, 11, 12, 13, 14, 15, 20, 25, 30, 40, 45, 50, 55, 57, 60, 65, 70, 75, 80, 85, 90, 95, 100, 105, 110, 115, 120, 121, 130, 140, 150, 160, 170, 180, 190, 200, 250, 300, 350, 400, 450, 500, 600, 700, 800, 900, or 1000 genes. Each possibility represents a separate embodiment of the invention. In some embodiments, expression levels are mRNA levels. In some embodiments, expression levels are protein levels.

In some embodiments, the detecting molecules are conjugated to a detectable moiety. In some embodiments, the detectable moiety is a fluorescent moiety. In some embodiments, the detectable moiety is a dye. In some embodiments, the detectable moiety is radioactive. In some embodiments, the detectable moiety is an isotopically pure element. In some embodiments, the detectable moiety is an immunohistochemical reagent. In some embodiments, the detecting molecules are antibodies. In some embodiments, the detecting molecules are PCR primers. In some embodiments, the detecting molecules are attached to a solid support. In some embodiments, the detecting molecules are in an array. In some embodiments, the detecting molecules are on a chip. In some embodiments, the detecting molecules are specific for the target cell, protein or mRNA. In some embodiments, being specific comprises less than 30, 25, 20, 15, 10, 9, 8, 7, 6, 5, 4, 3, 2, 1 or 0.5% incorrect binding. Each possibility represents a separate embodiment of the invention. In some embodiments, specific detection of an mRNA comprises 100% binding to the mRNA. In some embodiments, specific detection of the mRNA comprises 100% complementarity to the mRNA. In some embodiments, specific detection of an mRNA comprises at least 80, 85, 90, 91, 92, 93, 94, 95, 96, 97, 98, 99, or 100% complementarity to the mRNA. Each possibility represents a separate embodiment of the invention.

In some embodiments, the kit further comprises at least one detecting molecule for detecting at least one control gene. As used herein, a "control gene" is a gene that is unrelated to immunological age. In some embodiments, a control gene is a housekeeping gene. In some embodiments, a control gene is unrelated to determining immunological age. In some embodiments, a control gene is unrelated to immunology. In some embodiments, a control gene is unrelated to immune cells. In some embodiments, is a gene expressed in cells other than immune cells. In some embodiments, a control gene is a ubiquitously expressed gene. In some embodiments, a control gene is a gene whose expression does not vary between immune cell populations. In some embodiments, a control gene is a gene whose expression does not vary by age of the subject.

In some embodiments, a kit of the invention is for use in performing a method of the invention. In some embodiments, the kit of the invention is for testing a blood sample. In some embodiments, the detecting molecules of the invention are configured for detection in fluid. In some embodiments, the fluid is blood.

By another aspect, there is provided use of the detecting molecules for performing a method of the invention. In some embodiments, the detecting molecules are for use in performing a method of the invention.

By another aspect, there is provided a computer program product for determining the immunological age of subject, comprising a non-transitory computer-readable storage medium having program code embodied thereon, the program code executable by at least one hardware processor to:

a. receive measurements of relative frequencies of at least 3 immune cell populations in a blood sample from the subject,
b. calculate an immunological age of the subject by at least one of
  i. compare the measurements of relative abundance of immune cell populations to a dataset of measurements of immune cell population relative abundance in subjects with predetermined immunological ages; and
  ii. combine the measurement of relative abundance with data of measurements of relative abundance from at least 19 other subjects to produce a database, from said database calculate a trajectory for all at least 20 subjects based on the measurements of relative abundance; and
c. output a determined immunological age for the subject.

In some embodiments, the computer program product further transmits the output. In some embodiments, the output is transmitted to the subject. In some embodiments, the output is transmitted to a physician. In some embodiments, the physician is the subject's physician. In some embodiments, a method of the invention further comprises transmitting the determined immunological age. In some embodiments, a method of the invention further comprises transmitting the prognosis. In some embodiments, a method of the invention further comprises transmitting the diagnosis.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

As used herein, the term "about" when combined with a value refers to plus and minus 10% of the reference value. For example, a length of about 1000 nanometers (nm) refers to a length of 1000 nm+−100 nm.

It is noted that as used herein and in the appended claims, the singular forms "a," "an," and "the" include plural referents unless the context clearly dictates otherwise. Thus, for example, reference to "a polynucleotide" includes a plurality of such polynucleotides and reference to "the polypeptide" includes reference to one or more polypeptides and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

Various embodiments and aspects of the present invention as delineated hereinabove and as claimed in the claims section below find experimental support in the following examples.

EXAMPLES

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells-A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Strategies for Protein Purification and Characterization-A Laboratory Course Manual" CSHL Press (1996); all of which are incorporated by reference. Other general references are provided throughout this document.

Methods

Experimental Procedures.

Sample collection. Peripheral blood samples were obtained at the Stanford Clinical and Translational Research Unit from nine-year cohort coming in roughly three times per year as part of an influenza vaccine study, with individuals requested to return for annual visits following their year of enrollment, beginning 2007 (FIG. 7A-C for demographics). All volunteers were assessed as generally healthy at the time of initial enrollment based on an evaluation of their medical history and assessment of their vital signs. Exclusion criteria at time of enrollment were: an active systemic or serious concurrent illness; a history of immunodeficiency; any known or suspected impairment of immunologic function; diabetes mellitus treated with insulin; moderate to severe renal disease; blood pressure >150/95 at screening; chronic hepatitis B or C; recent or current use of immunosuppressive medication; malignancy, other than squamous cell or basal cell skin cancer (includes solid tumors such as breast cancer or prostate cancer with recurrence in the past year, and any hematologic cancer such as leukemia) which might jeopardize volunteer safety or compliance with the protocol; autoimmune disease; history of blood dyscrasias or hemoglobinopathies requiring regular medical follow up or hospitalization during the preceding year; use of any anti-coagulation medication; medical or psychiatric condition or occupational responsibilities that preclude subject compliance with the protocol; history of Guillain-Barré Syndrome; pregnancy; membership of the clinical study team; any condition which might interfere with volunteer safety, study objectives or the ability of the participant to understand or comply with the study protocol. Development of these conditions at the visits following enrollment did not exclude continuing participation in the study, unless in the opinion of the investigator, the condition interfered with the volunteer's safety, study objectives or the ability of the participant to understand or comply with the study protocol. In total, 65 mL whole blood was drawn per individual and processed by standard procedures to PBMC and serum. The samples were processed in the Stanford Human Immune Monitoring Center (HIMC) in a standardized manner with multiple deep phenotyping modalities profiled. The longitudinal analysis we conducted establishes an orthogonal approach to previous studies that analyzed subsets of these data from a cross-sectional perspective (FIG. 7E).

Determination of CMV seropositivity. Determination of CMV seropositivity was conducted by enzyme-linked immunosorbent assay (ELISA) using the CMV immunoglobulin G (IgG) ELISAkit (Calbiotech, catalog no. CM027G). Serum samples were thawed at room temperature, and dilutions were prepared according to the manufacturer's recommendations. Calculation of results was done on the basis of the controls provided by the vendor. For consistency, CMV status per individual was assessed using all longitudinal measurement as the most commonly observed CMV status.

Cell subset phenotyping. Cells were thawed and washed twice with warm culture media followed by staining and profiling, performed using flow cytometry technology in years 2007-2009 and CyTOF (mass cytometry) technology in years 2010-2015 and for the snapshot dataset (FIG. 7D). Cellular phenotyping by flow cytometry: Cells were stained for 30 minutes at 4C with an antibodies cocktail, followed by a wash and a resuspension in FACS buffer (PBS supplemented with 2% FBS and 0.1% sodium azide). Data were collected using DIVA software in an LRSII instrument (BD Biosciences), and data analysis was performed using FlowJo 8.8.6.Cellular phenotyping by CyTOF: One million live cells were resuspended in CyFACS buffer (PBS with 0.1% BSA, 2 mM EDTA and 0.05% Sodium Azide) and stained for 60 minutes with an antibodies cocktail in 100 ul on ice. Cells were then washed twice and stained with live-dead maleimide-DOTA stain (5 amg/ml maleimide-DOTA loaded with 139-Lanthanum or 115-Indium) for 30 minutes in 100 ul on ice, followed by fixation using paraformaldeyde (2%) in 100 ul overnight. Cells were washed twice and permeabilized in saponin permeabilization buffer for 45 minutes on ice, washed twice with CyFACS buffer and incubated with Ir-intercalator (Fluidigm, 1:2,000 dilution) for 20 minutes. Cells were then washed with CyFACS and twice with miliQ water. Samples were acquired by CyTOF machine (either CyTOF1 in years 2010-2013 and snapshot dataset, or Helios in years 2014-2015). Data were analyzed using FlowJo software.

Cytokine-response assays (phospho-flow). PBMCs were thawed in warm media, washed twice and resuspended at $0.5 \times 10^6$ viable cells/mL. 200 uL of cells were plated per well in 96-well deep-well plates. After resting for 1 hour at 37C, cells were stimulated by adding 50 ul of cytokine (IFNa, IFNg, IL-6, IL-7, IL-10, IL-2, or IL-21) and incubated at 37° C. for 15 minutes. The PBMCs were then fixed with paraformaldeyde, permeabilized with methanol, and kept at-80C overnight. Each well was bar-coded using a combination of Pacific Orange and Alexa-750 dyes (Invitrogen, Carlsbad, CA) and pooled in tubes. The cells were washed with FACS buffer (PBS supplemented with 2% FBS and 0.1% soium azide) and stained with the following antibodies (all from BD Biosciences, San Jose, CA): CD3 Pacific Blue, CD4 PerCP-Cy5.5, CD20 PerCp-Cy5.5, CD33 PE-Cy7, CD45RA Qdot 605, pSTAT-1 AlexaFluor488, pSTAT-3 AlexaFluor647, pSTAT-5 PE. The samples were then washed and resuspended in FACS buffer. 100,000 cells per stimulation condition were collected using DIVA 6.0 software on an LSRII flow cytometer (BD Biosciences). Data analysis was performed using FlowJo v9.3 (details regarding the gating scheme and fold-change calculation appear in Shen-Orr, S. S. et al. *Cell Syst.* 3, 374-384.e4 (2016)). Normalization of data acquired in 2008 is detailed in Shen-Orr, S. S. et al. *Cell Syst.* 3, 374-384.e4 (2016), whereas for data acquired in 2009-2012, we normalized the fold change values by division by fold-change measured on control samples that ran on the same plate.

Gene expression profiling. RNA was extracted from the PAXgene RNA blood tubes (PreAanalytiX GmbH, VWR part #77776-026, USA) using the QIAcube automation RNA extraction procedure according to the manufacturer's protocol (Qiagene Inc., Valencia, CA, USA). Amount of total RNA, and A260/A280 and A260/A230 nm ratios were assessed using the NanoDrop 1000 (Thermo Fisher Scientific Inc., Wilmington, DE). RNA integrity was assessed using the Agilent 2100 Bioanalyzer (Agilent Technologies, Santa Clara, CA). In each sample the RNA integrity number (RIN) were measured. For each sample, 100 ng of total RNA were used for first-strand cDNA synthesis by using T7 oligo (dT) primer at 42° C. for 2 hr, then for at least 2 min at 4° C. Single-stranded cDNA was converted to double-stranded cDNA for 1 hr at 16° C., then for 10 min at 65° C., then for at least 2 min at 4° C. Labeled complementary RNA (cRNA) was synthesized and amplified by in vitro transcription (IVT) of the second-stranded cDNA template using T7 RNA polymerase. Purified cRNA was fragmented by divalent cations and elevated temperature. 11 ug of labelled and fragmented cRNA was hybridized onto the PrimeView GenChip, washed, scanned, and extracted by following the user guides: GeneChip Fluidics Station 450 User Guide AGCC (P/N 08-0295), the GeneChip Expression Wash, Stain, and Scan User Guide for Cartridge Arrays (PN 702731), and the GeneChip Command Console User Guide (P/N 702569). Briefly, the fragmented and labeled targets were hybridized to the arrays per standard Affymetrix protocol, which includes 16-hour hybridization at 45C at 60 rpm in the Affymetrix GeneChip Hybridization Oven 645. The arrays were the washed and stained in the Affymetrix GeneChip Fluidics Station 450. The arrays were scanned using the Affymetrix GeneChip Scanner 3000 7G. After checking the quality of each individual array, the feature extraction files were imported into R Bioconductor and analyzed using the microarray package for probe filtering, quantile normalization, replicate probe summarization and log 2 transformation.

Computational Analysis.

Snapshot dataset analysis. Detecting longitudinally changing cell subsets. We constructed longitudinal models of the cell subsets frequencies both at the group and the individual level. Group level slopes were calculated using mixed linear models of the cellular frequencies against age, while taking the intercept of each individual as a random effect (LME4 R package). Individual level slopes were computed separately for each individual via median linear regression (quantreg R package) of the cellular frequencies against year. Principal component analysis. To check the global longitudinal dynamics of immune cell subsets, we applied principal component analysis (FactoMineR R package) using cellular frequencies of all the cell types measured in the snapshot dataset. Comparative analysis of inter-to intra-individual variation was applied using three methodologies: (1) With respect to the location in the 2-dimensional PCA space, the inter- and intra-individual Euclidean distances were compared; (2) With respect to individual cell-subsets, the intra-individual coefficient of variation values calculated for each individual across years were compared to the inter-individual coefficient of variation values calculated for each year across individuals (FIG. 8A); (3) With respect to the variance-explaining factors of each cell subset, the proportion of variance explained for each cell subset was quantified by regression of each cell subset frequency against age, CMV and subject identity, followed by extraction of an ANOVA table and decomposition of the total sum of squares into inter-individual variation (sum of squares attributed to subject ID) and intra-individual variation (residual sum of squares, FIG. 8B). For the longitudinal stability analysis, the lengths of within-individual trajectories were calculated as the sum of distances between sequential years in the PCA two-dimensional space. Individual-level slopes association analysis. To avoid bias introduced by repeated measures, for each cell-subset, median values of intra-individual frequencies were regressed against the old individuals' median positions along the two main PCA axes. The resulting p values corresponding to both PCs were combined by Fisher's methodology and corrected for multiple hypotheses by Benjamini-Hochberg methodology to obtain the correlation significance of the cell subsets with the main PCA axes. Correlations of individual-level slopes with the two main PCA axes were combined by taking the maximal absolute correlation obtained for each PCA axis.

Correction of year-to-year technical variation of cellular frequencies data of the ongoing dataset. To account for the technical differences between the years profiled in the ongoing dataset, we leveraged our finding regarding the longitudinal stability of young immune profiles. Specifically, we treated the common young individuals measured at two consecutive years as controls and adjusted the levels of each cell subset linearly to minimize the mean annual difference between the cell subset's frequencies as measured in the control individuals. Starting with 2014 and heading backwards, data of each year were adjusted based on the corresponding upcoming year.

Identification of cell subsets whose frequency change with age with cross-sectional analysis of the ongoing dataset. The adjusted ongoing dataset includes cellular frequencies data measured in the years 2007-2015. For each cell subset, we generated a linear regression model correlating its frequency against age and CMV separately for each year in which the cell subset was measured. We combined the resulting age- and CMV-associated p values using a modified generalized Fisher method for combining p values obtained from dependent tests (CombinePValue R package) and adjusted the resulting combined p values to multiple hypotheses using Benjamini-Hochberg method. This resulted in 33 and 22 cell subsets with BH-adjusted combined age-related and CMV-related P<0.05, respectively. To estimate the age-related effect size on cellular frequencies, we used the average cross-sectional ratio between the old and young adults following filtering out those years in which the measured ratio was opposite in direction to most of the analyzed years.

Cell subsets classification based on longitudinal dynamics and attractor point determination. Cell subsets classification. We classified cell subsets based on two criteria: (1) existence of longitudinal dynamics and (2) significant correlation between annual change and baseline frequencies. Specifically, in criterion (1), we checked whether the annual changes in the cell subset's frequency were significantly different from zero (P<0.05, two tailed t-test). In criterion (2) we checked whether there was a significant correlation between annual change of cell-subset's frequency and its baseline frequency using a median linear regression model (quantreg R package, P<0.05 calculated by a bootstrapping test). Those cell subsets that did not fulfilled criterion (1) were classified as fluctuating; Those cell subsets that fulfilled only criterion (1) were classified as slow linear; Those cell subsets that fulfilled both criteria were classified as asymptotic. To avoid the effect of technical noise on cellular classification, for each cell subset we excluded those yearly intervals with mean direction of annual changes that contradicted the trend observed between age-groups. We then excluded those cell subsets with less than two remaining yearly intervals as well as those exhibiting mean annual change greater than the mean cross-sectional difference between age-groups, what may indicate a high impact of technical noise. Following these filtering steps, six cell subsets were excluded out of the 33 age-dependent cell subsets. This classification strategy is detailed in FIG. 11, and final classifications of each cell subset of the 33 cell subsets exhibiting age-association are detailed in Table 1. Attractor point determination. The attractor point per asymptotic cell subset was defined as the intersection of the linear annual-change baseline model with the baseline-axis. Confidence intervals for each attractor point were estimated via bootstrapping (boot R package).

Significance assessment of the attractor point location. Those cell subsets classified as asymptotic (i.e. exhibiting annual change both significantly different from zero and significantly dependent on baseline frequencies) were subjected to set of three tests assessing the significance of their behavior. In these tests we repeatedly generated random regression lines corresponding to the null expected annual change relationship to baseline frequency and tested the odds of observing the real-data result. As null regression of cell subsets frequencies towards their mean is expected, our use of the null models and the significance measure we provide relate only to the derived location of the attractor point (i.e. the intersection with the baseline axis). Below we detail the three different methodologies we applied to determine the significance of the attractor point location. Summarizing the results obtained for the three different methodologies, 9 cell subsets (out of 11 cell subsets classified as asymptotic) exhibited attractor point locations that were identified as significantly different from random under all the tests (P<0.05). (a) Permutations. We permuted the frequencies of each cell subset per individual with respect to time a hundred times. Each time and for each cell subset, we calculated the annual change values and regressed them against the baseline frequencies, yielding 100 null-models per cell subset. For each model, we calculated the location of the attractor point as the intersection with the baseline axis, to produce a null distribution of 100 attractor points for each cell subsets. We then related the real attractor point obtained using the real longitudinal data to this null distribution, what defined a p value. For instance, in a case where the real attractor point was located at the extreme 1% of the null distribution, a p value of 0.01 was calculated. This analysis resulted with 11 cell subsets (out of 11 asymptotic cell subsets) with p-value <0.05. (b) Random sampling of cellular frequencies. We applied a model that simulates the cellular frequencies of different individuals based on their statistical characteristics observed in the real data. Specifically, in this test, we assumed that the cellular frequencies of each cell subset in each individual were sampled from a normal distribution with cell-subset- and individual-specific mean and standard deviation, both were calculated from the data by standard estimators. For each cell subset, we simulated a typical longitudinal set of frequencies per individual by sampling values from these individual-specific distributions and regressed the obtained values of annual change against the baseline values. This analysis was repeated a hundred times per cell subset to achieve a hundred null-models. For each null model, we calculated the attractor point as the intersection of the null model with the baseline axis, to yield a null distribution of 100 attractor points per cell subset. P values were then obtained by relating the real attractor point to this distribution, similar to (a). This analysis resulted with 10 cell subsets (out of 11 asymptotic cell subsets) with p-value <0.05. (c) Random sampling of cellular frequencies with a longitudinal trend. To achieve a model better reflecting the longitudinal trends observed in the data, we further modified the model described in (b). For this, following sampling of the cell subset frequencies per individual from a normal distribution, we sorted the resulting sampled frequencies such that they will match the cross-sectional trend we observed (for instance, cell types whose abundance increase with age were sorted to preserve an increasing trend). Then we applied the same analysis as described in (b). This analysis resulted with 9 cell subsets (out of 11 asymptotic cell subsets) with p value <0.05.

Retrospective group-level assessments of cell-subsets classification. Below we specify two additional analyses testing different dynamic properties that are expected to distinguish asymptotic from linear dynamics on a per-cell basis. The obtained results were then compared between the groups of those cell subsets classified as asymptotic and linear to assess the significance of the classification at the group level. (a) Decreasing trend of the absolute annual-change. Unlike linear cell subsets, the abundance levels of asymptotic cell subsets are expected to stabilize with time as they approach the attractor point levels. To quantify this, for each cell subset classified as either asymptotic or linear, we regressed the absolute annual-change values against the visit number, to obtain a slope corresponding to the mean magnitude of annual change differences along the study timecourse. The obtained slopes of those cell subsets classified as asymptotic were significantly negative (P=0.03, t test, n=11), whereas the ones of those cell subsets classified as linear showed no significant difference from zero (P=0.4, t test, n=5). (b) Correlation between cell subsets' abundances measured at subsequent years. Asymptotic behavior can be modeled using the following equation: x=da x+ba, where aa<0. The solution of this equation is $$x(t) = c_a \cdot e^{a_a t} - \frac{b_a}{a_a},$$

implying that:

$$x(t+1) = x(t) \cdot e^{a_a} + \frac{b}{a} \cdot (e^{a_a} - 1).$$

Linear behavior can be modeled using the equation: $\dot{x}=b_l$. The solution of this equation is: $x(t)=b_l \cdot t+c_l$, implying that: $x(t+1)=x(t)+b_l$. Thus, while both dynamic patterns support a linear relationship between the cellular frequencies measured at two subsequent years, the corresponding slopes differ such that cell subsets that change linearly exhibit slopes of one whereas cell subsets that change asymptotically exhibit smaller-than-one slopes. To check this in our data, for each cell subset classified as either asymptotic or linear, we regressed the cellular frequencies measured at two subsequent years and calculated the resulting slopes. We observed that the cell subsets we classified as "slow linear"

exhibited slopes that are not significantly different from one, whereas those cell subsets classified as "asymptotic" exhibited slopes that are significantly lower than 1 (t test P=0.11 (n=5), $2.78 \cdot 10^{-5}$(n=11), for linear and asymptotic cell subsets, respectively).

Cell Subsets order analysis. To estimate the cascade in which the eleven asymptotic cell subsets reached their attractor points, for each individual and for each asymptotic cell subset, we identified the first year in which the cell subset reached its steady state levels. Then, for each pair of cell subsets, we applied a binomial test to identify pairs of cell subsets that consistently and significantly (P<0.05) exhibited a certain ordering within individuals. For global cell subsets ordering, we applied a modified version of the topological sort algorithm to derive modules of cell subsets whose ordering was conserved across individuals, yet without identified internal ordering.

Longitudinal correlation between cell subsets. We calculated the Spearman correlation between each pair of cell subsets within each individual across different years and averaged the resulting correlations across individuals. Correlations' significance was assessed by applying a hundred permutations of the frequency values for each cell subset within an individual followed by re-calculation of the pairwise correlations.

Trajectory Assembly. Scaling of cellular frequencies. To normalize the effect of the cell subset-specific dynamic range of cellular frequency on trajectory building, abundance levels were normalized prior to trajectory assembly. Specifically, per cell-subset, we first calculated the mean and standard deviation of those frequency values that were between the 10th and 90th percentiles. We used these values to normalize cellular frequencies by subtraction of the mean and division by standard-deviation. Cell-subsets selection. We used those cell subsets with a significant non-zero annual change (criterion (1)) whose frequencies did not differ across the years due to technical variation. To identify these, we applied principal component analysis on the scaled frequencies of the 21 cell subsets whose abundance changed longitudinally during the course of the study and were measured in the years 2012-2015, years that included the full panel of cell types. This analysis revealed a clear separation of years 2014-5 from 2012-3, specifically by the second principal component. Hence, we excluded those cell subsets whose absolute correlation with the second principal component exceeded 0.6, resulting with 18 cell subsets. Specifically, the cell subsets used for trajectory building were: B cells, CD161$^-$CD45RA$^+$ Tregs, CD161$^+$ NK cells, CD28$^-$ CD8$^+$ T cells, CD57$^+$ CD8$^+$ T cells, CD57$^+$ NK cells, effector CD8$^+$ T cells, effector memory CD4$^+$ T cells, effector memory CD8$^+$ T cells, HLADR CD38+ CD4$^+$ T cells, naïve CD4$^+$ T cells, naïve CD8$^+$ T cells, PD1$^+$ CD8$^+$ T cells, T cells, CXCR5$^+$ CD4$^+$ T cells, CXCR5$^+$ CD8$^+$ T cells, Th17 CXCR5$^-$ cells, Tregs. Trajectory Assembly. We applied the diffusion maps algorithm (destiny R package) on the scaled cellular frequencies of the selected cell subsets that were measured in the years 2012-2015, years that included the full panel of cells measured by CyTOF. Resulting diffusion pseudotime values were scaled to 0-1 range. We then mapped samples measured by CyTOF in the remaining years (2010-2011) onto the trajectory using k-nearest neighbor algorithm with k=10 using the trajectory-building cell subsets that were measured also in the mapped year. Cellular frequencies profiles along the trajectory. For the identified cell subsets that were classified as: fluctuating, asymptotic or slow-linear, we calculated the slope of their frequencies along the older adults' trajectory using linear regression per cell subset.

Dynamics of cellular response to cytokines along the trajectory. Identification of phoshpo-flow cytokine responses that changed significantly with age. We first excluded four samples (three samples from 2011 and one sample from 2012) that were identified as outliers by hierarchical clustering applied on all the samples per year using all phospho-flow features. To identify those phospho-flow cytokine responses that changed significantly with age, we first calculated per year (2008-2013) and for each phospho-flow cytokine response, the dependency of its levels with age by linear regression. We then excluded from further analysis the phospho-flow data collected in the years: 2010 and 2013, for both less than 20% of the measured responses were significantly dependent on age, as opposed to more than 35% in the other years. Per cytokine response and for the remaining years, we combined the p-value significance values calculated per year (2008, 2009, 2011, 2012) using a modified generalized Fisher method for combining p values obtained from dependent tests (CombinePValue R package). This resulted with 87 phospho-flow cytokine responses that changed significantly with age (BH-adjusted P<0.05). From this group, we extracted only those cytokine responses that changed significantly with age in at least two years, and for which we could derive a consistent trend (more than a half of the years in which a significant trend was reported exhibited a similar trend). This filtering step resulted with 40 phospho-flow cytokine responses that changed significantly and consistently with age. Cytokine-response score calculation. Cytokine response score was calculated as the sum of the following individual phospho-flow cytokine responses: CD8$^+$-pSTAT1-IFNa, CD8$^+$-pSTAT3-IFNa, CD8$^+$-pSTAT5-IFNa, CD8$^+$-pSTAT1-IL6, CD8$^+$-pSTAT3-IL6, CD8$^+$-pSTAT1-IFNg, CD8$^+$-pSTAT1-IL21, CD4$^+$-pSTAT5-IFNa, Bcells-pSTAT5-IL6, Bcells-pSTAT1-IFNa, Monocytes-pSTAT3-IL10, Monocytes-pSTAT3-IFNg, Monocytes-pSTAT3-IFNa, Monocytes-pSTAT3-IL6. Identification of individual phospho-flow cytokine responses that changed significantly along trajectory. Levels of each phospho-flow cytokine responses identified to be associated with age were correlated with the trajectory consisting of samples of older adults using linear regression per year (2011 and 2012). Per phospho-flow cytokine response, we excluded those years in which there was a significant difference along the trajectory that contradicted the young-old trend. Then, p values per cytokine response were combined across the relevant years using Fisher's method and were adjusted for multiple hypotheses using Benjamini-Hochberg method, resulting with five responses with BH-false discovery rate lesser than 20%.

Cardiovascular assessment. Echocardiography data were obtained and processed as described in Shen-Orr, S. S. et al. Defective Signaling in the JAK-STAT Pathway Tracks with Chronic Inflammation and Cardiovascular Risk in Aging Humans. Cell Syst. 3, 374-384.e4 (2016), herein incorporated by reference in its entirety.

Gene expression analysis. Preprocessing. For gene-expression analysis we used gene-expression measurements collected on individuals during the years 2010-2015, since these are the only years that participated in trajectory building. Expression values across all years were first quantile normalized to allow comparative analysis across all years. We then excluded four gene-expression samples (three samples from 2011 and one sample from 2014) that were identified as outliers by hierarchical clustering applied on all the gene-expression samples per year. Identification of differentially expressed genes across age groups. Per year and for each gene, we calculated a linear regression model describing the dependency of its expression levels on age. To combine p-values obtained per gene across years, we used a modified generalized Fisher method for combining p values obtained from dependent tests42 (CombinePValue R package). We identified 4,605 genes whose expression levels were significantly dependent on age (Benjamini-Hochberg corrected combined P<0.05). Next, we identified only those genes that exhibited an age-dependent trend across the years as those genes for which a significant (P<0.1) contradicting trend was reported in less than one out of three years, resulting with 4,081 genes. Identification of the genes whose expression changed along the trajectory. For each gene of these 4,081 genes and per year, we derived a linear regression model describing the dependency of its expression levels on the trajectory using only old adults' samples. We then combined the p-values calculated across the years by Fisher's method under exclusion of those years in which a significant trend (P<0.05) along the trajectory was identified that contradicted the one observed across age-groups. In this way, we identified 337 genes differentially expressed along the trajectory as the ones with BH-adjusted combined P<0.05. To gain a robust genomic signature corresponding to the location along the trajectory, we used only those genes whose expression changed significantly (P<0.05) in more than 0.6 of the years where they were measured and whose trend in expression along trajectory did not significantly contradict the young-old trend, resulting with 121 genes.

Normal expression levels of the trajectory-related gene-signature in immune cell-subsets (DMAP analysis). Normalized expression data were downloaded from GEO (GSE24759). Since our trajectory-correlated genomic signature was identified using gene-expression data of peripheral blood cells, consisting predominantly of mature cells, gene-expression data of sorted immature progenitor cell types were excluded from the further analysis. Following this filtration step, the expression matrix included 93 samples corresponding to 17 sorted peripheral blood cell-subsets. Out of the 121 genes identified as significantly and consistently changing along the trajectory, 79 genes were represented in the DMAP dataset. Probes were converted to the respective gene symbol by choosing per gene the probe with the maximal expression levels across samples. We first calculated the mean expression of each gene by each cell subset and used this to identify per gene the three cell subsets exhibiting the highest expression levels. Then, per cell subset, we calculated the difference between the number of trajectory-upregulated genes and the trajectory-downregulated genes expressed by the cell-subset.

Gene-expression adjustment for variation in cell type proportions. Gene expression data were adjusted for variations in selected cell type proportions (neutrophils, CD8+ T cells, B cells, CD85j+ CD8+ T cells, naïve CD4+ T cells, effector memory CD8+ T cells) by regressing them out from each gene expression profile within each year separately. Because the cell proportions profiling data were generated on PBMC samples while the gene expression data were from whole blood samples, we first "aligned" them by transforming each cell type percent-PBMC frequencies (PPBMC) into percent-whole blood frequencies ($P_{WB}$) using lymphocyte and monocyte proportions measured by complete blood count (CBC) when available (i.e. in years 2010-2013): $P_{WB}=P_{PBMC} \cdot (CBC_{lymphocytes}+CBC_{monocytes})$. For study years where CBC data were not available (i.e. in years 2014-2015), we estimated the neutrophil proportions directly from the whole blood gene expression data using ImmunoStates basis immune signatures and computed the PBMC compartment proportions as $1-P_{neutrophil}$. Whole blood cell type proportions were then standardized (centered, unit variance) and a multivariate linear model including the proportions as covariates was fitted on the non-log scale expression profiles of each gene separately. The adjusted gene expression profiles were then defined as the sum of the fitted intercept coefficient and the residuals.

Framingham Heart Study data analysis. IRB approval to analyze the Framingham Heart Study data was obtained from the Bnai Zion ethics board (IRB number: BNZ-0029-15).

Gene-expression preprocessing: Normalized gene-expression data generated using the platform: Affymetrix Human Exon 1.0 ST were downloaded from dbGap (study id: phs000007) and include the individuals from the Offspring and Generation 3 cohorts that attended the $8^{th}$ and $2^{nd}$ clinical exams, respectively, and that were signed on either HMB-IRB-MDS or HMB-IRB-NPU-MDS research consent forms (n=2,418, 3133, for Offspring and Generation 3, respectively). These gene-expression data were first corrected for the different batches using Combat algorithm (sva R package) while avoiding adjustment of age and gender induced effects, followed by conversion of the probes into gene-ids by choosing per gene the probe that yielded the maximal expression levels across randomly chosen 20 samples.

IMM-AGE approximation: Of the 121 genes that were identified as consistently and significantly changing along the trajectory, 103 genes were also present in the Framingham gene-expression dataset. To reduce the technical noise stemming from changing the gene-expression dataset, what may influence the inter-gene correlation relationships, we refined this gene-set and chose only those 57 genes that were highly correlated with the main PCA axis (absolute Pearson >0.4), an axis that significantly and consistently reflected the calculated IMM-AGE scores in our cohort across years (data not shown). We quantified the enrichment of this gene-set in each participant of the Framingham study using single-sample gene-set enrichment projection (ssGSEA) and used the resulting enrichment scores as an approximation of the IMM-AGE scores of the Framingham participants. To improve the correspondence between the IMM-AGE score and chronological age, we applied linear scaling on the IMM-AGE scores that is based on a linear regression of the IMM-AGE scores against chronological age using the Offspring cohort individuals, a cohort with a relatively homogeneous range of ages resembling the one observed in our cohort. A linear model of the resulting scaled IMM-AGE scores against chronological age had slope and intercept equal to 1 and 0, respectively.

Clinical association analysis: Here we used only the Offspring cohort individuals as they were older than the Generation 3 cohort individuals at the date of gene-expression profiling (66.8±9.2 vs. 45.5±8.7), thus exhibiting substantially higher prevalence of cardiovascular disease and mortality. Relevant phenotypic datasets were downloaded from dpGap including: gender and age at the $8^{th}$ exam (pht003099); smoking status, blood pressure and blood pressure treatment (pht000747); HDL, total cholesterol and fasting glucose (pht000742); diabetes treatment (pht000041; since diabetes treatment was not available for exam 8, we used the relevant information from exam 7, assuming the treatment status did not change between these two exams). Cardiovascular disease status at the $8^{th}$ exam and all-cause mortality during follow-up time were derived from the files:

"survival and follow-up status for cardiovascular events" (pht003316), and "survival-all cause mortality" (pht003317), respectively.

Survival analysis: For the cardiovascular association analysis, the IMM-AGE score was adjusted by linear regression to the cardiovascular covariates used for estimating the ASCVD clinical risk score, specifically: age, gender, smoking status, diabetes, total cholesterol, HDL cholesterol, and blood pressure. For all-cause mortality association analysis, we calculated a multivariate Cox regression model regressing all-cause mortality against the above-mentioned cardiovascular risk factors, cardiovascular disease status assessed on the date of the $8^{th}$ exam, and the IMM-AGE score. For the Kaplan Mayer survival plot, IMM-AGE scores were adjusted by linear regression to the above-mentioned cardiovascular risk factors and cardiovascular disease status at the $8^{th}$ exam, followed by stratification of individuals using a threshold calculated as the median adjusted IMM-AGE scores across individuals. Survival analyses were performed by R survival package.

Methylation data preprocessing: Our analysis included the Framingham-Heart Study Offspring cohort that attended the $8^{th}$ clinical exam for which methylation data were available. Methylation data generated using the platform: Infinium HumanMethylation450 BeadChip of Illumina were downloaded from dbGap (study id: phs000007). Raw data were normalized with background correction followed by calculation of beta values (minifi R package). We excluded those samples with more than 1% of the probes exhibiting detection p value greater than 0.05, and calculated Horvath's DNA methylation age per sample using the online calculator (https://dnamage.genetics.ucla.edu/). We excluded samples based on gender mismatch, poor correlation with gold-standard (<0.85), extremely high calculated DNA methylation age (>120), and those samples with more than two technical replicates. For those individuals having two technical replicates, DNA methylation age was averaged. These filtering steps resulted with 2,693 individuals with available DNA methylation age.

Clinical association analysis of DNA methylation age: In the analysis used to compare DNA methylation age and IMM-AGE, both scoring systems were adjusted using linear regression for cardiovascular risk factors, including: age, gender, smoking status, total cholesterol, HDL cholesterol, blood pressure status, diabetes, and existence of cardiovascular disease, followed by exclusion of outlier samples for which the adjusted DNA methylation age exceeded the $99^{th}$ percentile. For clinical utility comparison analysis, a multivariate Cox regression model was calculated regressing overall survival against the above-mentioned cardiovascular risk factors, existence of cardiovascular disease and both biological age metrics.

Data availability. Patients' ids were shuffled to protect patients' privacy. Raw fcs files of the ongoing dataset used both for cellular phenotyping and phospho-flow analysis were deposited into Immport website (immport.org/immport-open/public/home/home) and can be downloaded using the following accession codes stratified by year: SDY212 (2008), SDY312 (2009), SDY311 (2010), SDY112 (2011), SDY315 (2012), and SDY478 (2013). Raw gene-expression.CEL files for years 2011-2012 were deposited into Immport website and can be downloaded using the following accession codes stratified by year: SDY112 (2011), SDY315 (2012). Raw and processed gene-expression data for years 2013-2015 are available in GEO website (ncbi.nlm.nih.gov/geo/) through the following accession numbers: GSE123696 (2013), GSE123687 (2014) and GSE123698 (2015). DMAP gene-expression data are publicly available through GEO website (ncbi.nlm.nih.gov/geo/) through the accession number: GSE24759. Gene-expression and Methylation data of Framingham Heart Study are available through dbGap database (study id: phs000007). Phenotypic data are similarly available using the following accession codes: gender and age at the $8^{th}$ exam (pht003099); smoking status, blood pressure and blood pressure treatment (pht000747); HDL, total cholesterol and fasting glucose (pht000742); diabetes treatment (pht000041). Cardiovascular disease status at the $8^{th}$ exam and all-cause mortality during follow-up time were derived from the files: "survival and follow-up status for cardiovascular events" (pht003316), and "survival-all cause mortality" (pht003317), respectively.

Example 1: Longitudinal Tracking of Multiple Immune-Features

To assess at high-resolution the dynamics of older adults' immune-system, we conducted a multi-omics profiling of peripheral blood samples collected annually from young and older adults during the years 2007-2015 as part of Stanford-Ellison longitudinal aging study. The cohort included 135 healthy individuals: 63 young (aged 20-31 at enrollment) and 72 older adults (aged 60-96 at enrollment) (FIG. 7A-C, Methods). Samples were profiled by two experimental designs that yielded two datasets: An ongoing design, in which samples were profiled annually using a suite of technological platforms available at that time for measuring cellular phenotyping, cytokine-stimulation assays and whole-blood gene-expression (Methods); And a snapshot design, in which longitudinal samples of 18 participants of the ongoing dataset (3 young, 15 older-adults) were assayed simultaneously for deep phenotyping of blood cell subsets by mass-cytometry, thereby removing much of the concern of year-to-year technical variation (FIG. 7D-E). This complementary dual design allowed for a comprehensive and reasonably powered longitudinal analysis of immune-system changes over time (FIG. 1).

Example 2: Individuals' Cellular Immune-Profiles Vary in their Baseline Values and Rates of Change To understand the dynamics of immune-cells in healthy older adults, we first analyzed the snapshot-dataset profiled by single-cell mass-cytometry (CyTOF). We manually gated 73 immune cell-subsets and for each one of them we calculated the group—and individual-level longitudinal slopes in frequency for older adults (Methods). For most cell-subsets, the group-level longitudinal slopes matched the known directions of age-induced alterations. For instance, naïve CD8+ T-cells exhibited a decline over time at the group-level (FIG. 2A). However, though the longitudinal individual-slopes were skewed towards the direction of the longitudinal group-level slopes, they exhibited a high inter-individual variability including individuals changing in an opposite direction to the group-slope (FIG. 2A). This behavior was observed for multiple immune cell-subsets such as: B-cells, CD8+ CD28-T-cells, NK and CD8+ T-cells expressing CD57 (FIG. 2B).

To check whether the large inter-individual variation is reflected in the global dynamics of immune profiles, we applied principal component analysis (PCA) using all cellular frequencies measured in the snapshot-dataset (FIG. 2C). The main two principal components, capturing together 37% of the total variability, were highly correlated with the frequencies of many immune-senescence associated cell-subsets, such as: CD28⁻ CD8⁺ T-cells, naïve CD4+ and naïve CD8+ T-cells, and memory B cell. Furthermore, these axes were significantly correlated with age and CMV, a known accelerator of immune-aging (linear-regression $P_{PC1}=1.75 \cdot 10^{-8}$, $2.78 \cdot 10^{-5}$; $PPC2=7.47 \cdot 10^{-9}$, 5.39.104, for age and CMV, respectively, n=94), indicating that the two-dimensional PCA space reflects the overall immunosenescence levels. Of note, the variation between-individuals was greater than within an individual over time both with respect to the position on the PCA space and to the majority of individual immune-cell subsets levels (t-test $P<2.2 \cdot 10\text{-}16$ for immune-profiles; BH-adjusted t-test P<0.05 for 82.19% of cell-subsets, Methods, FIG. 8A-B).

To study the dynamics of an individual's immunosenescence levels, we calculated per individual the trajectory's length in the PCA two-dimensional space (Methods). Young individuals exhibited shorter trajectories compared to older adults, indicating their relative longitudinal stability with respect to immunosenescence-related cell subsets (FIG. 8C, t-test P=0.03, Methods). We thus sought to leverage the pronounced dynamics of older adults' immune profiles to study the factors governing the large inter-individual variability of the individual slopes of immune cell-subsets. For this, we correlated for each cell-subset the individual-level slope of older adults against their age and against their location in the 2-dimensional PCA space (as a proxy to immunosenescence levels), where both values correspond to the baseline visit. Notably, baseline location of older adults in the PCA space dictated longitudinal dynamics more than age exclusively among those cell-subsets that correlate with the main axes (FIG. 2D, FIG. 8D, Methods, paired t-test $P=1.7 \cdot 10^{-4}$ (n=39), 0.085 (n=34) for cell-subsets either correlated or not with PCA axes, respectively). Taken together, during the study baseline immunosenescence levels dictate the longitudinal dynamics more than age in a cell-subset dependent manner.

Example 3: Immune Cells in Older Adults Converge Towards Steady-State Levels in a Baseline Dependent Manner, Yielding an Attractor Point To extend these findings quantitatively, we turned to the large ongoing dataset that includes longitudinal cell-subsets profiling of 135 individuals. We observed a large year-to-year variation that spanned both age groups due to technical issues inherent to the annual profiling (FIG. 7D, 9A). Leveraging the insight from the snapshot dataset regarding the longitudinal stability of the young immune-profiles, we used the young cohort to adjust the ongoing dataset, yielding an improvement of the correlation between the two datasets (Methods, FIG. 9).

We first identified by a cross-sectional analysis 33 cell subsets as consistently associated with age following CMV adjustment in the 9-years of the study (FIG. 3A, Methods, Benjamini-Hochberg adjusted combined P<0.05). These included multiple cell subsets that have previously been linked to immunosenescence such as: CD8+ T-cell subsets lacking expression of CD28 or those expressing CD85j, CD57 or PD1, whose abundance increased with age, as well as naïve CD8+ T-cells whose abundance decreased (FIG. 3A). Furthermore, we noted drastic age-dependent changes in the frequencies of monocytes, NK cells, B cells, and multiple CD4+ T-cell subsets.

To characterize the longitudinal dynamics of cellular frequencies, we calculated for each of these cell-subsets the difference in frequency between two consecutive years, namely: annual change (FIG. 3B). Of the 33 cell-subsets, 16 cell-subsets exhibited annual changes that were significantly and consistently different from zero with a direction that reliably matched the trend observed with age (Methods). This indicates that while some cell-subsets continued changing during the study other cell-subsets were stable, and the detected age effect on their frequencies suggest that a major part of their dynamics occurred before the participants' entry into of the study.

To understand what dictates cell-subsets' dynamics, we used those cell-subsets that continued changing during the study and correlated their annual change with age (FIG. 3B-C, top). However, of all cell subsets, we could not detect any significant correlation between the two (FIG. 10). Motivated by our previous finding regarding the effect of baseline immunosenescence levels on dynamics, we correlated the annual change in cellular frequencies against the corresponding baseline frequencies for each cell-subset (Methods). We observed significant negative correlations between annual change and baseline frequencies for most cell-subsets that were not restricted to extreme baseline values (FIG. 3B-C, bottom, Table 1). Thus, the rates in which the immune-cells frequencies change over time in older adults depend on the present frequency rather than on age.

TABLE 1

| cell subset | technical issues | annual change p value (t test) | p value (bootstraping test) | classification |
|---|---|---|---|---|
| naïve CD8+T | none | 4.49E−14 | 5.32E−06 | Asymptotic |
| CD27+CD8+T | none | 0.396473097 | 0.681335521 | Fluctuating |
| CD85j+CD8+T | none | 3.43E−08 | 0.551303665 | Linear |
| effector CD8+T | none | 0.001382352 | 0.011331943 | Asymptotic |
| CD28−CD8+T | none | 4.45E−07 | 0.000504563 | Asymptotic |
| B | none | 6.96E−08 | 4.24E−14 | Asymptotic |
| CXCR5+CD4+T | none | 6.31E−11 | 0.00509845 | Asymptotic |
| CD161−CD45RA+Tregs | none | 2.86E−06 | 1.94E−05 | Asymptotic |
| effector memory CD8+T | * | — | — | — |
| naïve CD4+T | none | 5.94E−05 | 5.33E−07 | Asymptotic |
| CD57+CD8+T | none | 4.13E−11 | 0.829582773 | Linear |
| lymphocytes | none | 0.126771625 | 2.17E−05 | Fluctuating |
| central memory CD4+T | none | 0.688400779 | 8.28E−13 | Fluctuating |
| NK | none | 0.142336635 | 3.05E−09 | Fluctuating |
| monocytes | none | 0.140643701 | 3.52E−06 | Fluctuating |
| Th1 TFH CD4+T | none | 0.136097797 | 0.000258047 | Fluctuating |
| Tregs | * | — | — | — |
| Th2 non-TFH CD4+T | none | 5.23E−08 | 0.05416943 | Linear |

TABLE 1-continued

| cell subset | technical issues | annual change p value (t test) | p value (bootstraping test) | classification |
|---|---|---|---|---|
| CD8+T | none | 0.09473342 | 8.32E−06 | Fluctuating |
| CXCR3−CCR6−CXCR5+CD8+T | none | 0.328317521 | 0.057891573 | Fluctuating |
| CXCR5+CD8+T | none | 0.00086566 | 1.40E−08 | Asymptotic |
| Th2 TFH CD4+T | none | 0.731297415 | 0.00017367 | Fluctuating |
| PD1+CD8+T | none | 0.018728684 | 0.414914751 | Linear |
| plasmablasts | none | 0.844790581 | 0 | Fluctuating |
| CD57+NK | less than 2 intervals | — | — | — |
| HLADR−CD38+CD4+T | none | 0.000365196 | 0 | Asymptotic |
| Th17 CXCR5− CD4+ T | none | 1.98E−05 | 3.73E−07 | Asymptotic |
| T | none | 3.38E−06 | 0.011706325 | Asymptotic |
| Th1 non-TFH CD4+T | * | — | — | — |
| CXCR3−CCR6+CXCR5+CD8+T | * and less than 2 intervals | — | — | — |
| CD161+NK | * | — | — | — |
| effector memory CD4+T | none | 1.03E−06 | 0.068418002 | Linear |
| CD94+NK | none | 0.257305982 | 9.38E−08 | Fluctuating |

* mean annual changes greater than the mean cross-sectional difference between age-groups Example 4: Cell-subset dynamics dictate three stages describing an ordered convergence on a high-dimensional attractor point We sought to extrapolate from the baseline: annual-change model the dynamic behavior of cell-subset's frequency during the nine-year course of the study. The negative correlation between annual-change and baseline levels implies that individuals with high frequencies decreased their levels whereas those with low frequencies increased their levels. Between these lies an intermediate point around which the cell-subset's levels are stable and towards which these two extremes converge. We reasoned that for each cell-subset that continued changing during the study in a baseline-dependent manner one could glean the frequency towards which the cell-subset converges on, i.e. the steady-state frequency the system 'pushes' the cell towards, namely: an older-adult attractor point (FIG. 4A).

The 33 age-affected cell-subsets could be classified into three classes representing sequential stages of convergence on their homeostatic levels based both on their longitudinal dynamics and whether we can locate their attractor-points (FIG. 4B, FIG. 11, Table 1). Of particular relevance, 11 cell-subsets exhibited significant longitudinal dynamics that depended on baseline, allowing us to derive the attractor-point, corresponding to where the cell-subset converges (Methods). These cell-subsets, including CD8+ CD28-T-cells, we classified as 'asymptotic', located their attractor point, and quantified confidence intervals and p-values on their attractor-point location (FIG. 4D-F middle, FIG. 12A, Methods). Moreover, as a group, the dynamics of these cells better fit an asymptotic model than a linear one (P<0.03, Methods). Conversely, 5 cell-subsets including: CD57+ CD8+ T-cells, exhibited significant and baseline-independent longitudinal dynamics, barring the identification of an attractor-point and suggesting a slow linear dynamic (FIG. 4C, F left, FIG. 12B). Accordingly, the dynamics of these cell subsets as a group did not fit an asymptotic model (P>0.11, Methods). Last, for eleven cell subsets, including NK-cells, we could not detect significant longitudinal dynamics, despite their frequency was significantly affected by age. These cell subsets had already reached the attractor-point levels and continued 'fluctuating' around it during the course of the study (FIG. 4E-F right, FIG. 12C). The remaining six cell-subsets were excluded due to a lack of confidence in our ability to classify them (Methods, Table 1). Thus, our longitudinal measurements enabled inference of a global dynamic model in older adults through cell-subsets classification and identification of attractor-point levels towards which they converge.

The fluctuating cell subsets indicate that cell-subsets do not reach their attractor point simultaneously. Asymptotic cell subsets greatly varied in the age at which they reached their attractor point across individuals, whereas within individuals they reached their attractor point levels relatively concomitantly (FIG. 13A-B, median interquartile range 14.75, 2 years, respectively). This suggested it may be possible to infer an ordering of cell-subsets convergence based on the timing when they reach their attractor-point levels within an individual. For this, we identified pairs of cell-subsets whose internal ordering was conserved across individuals and used them to derive a global cascade consisting of six modules of cell-subsets that reach their attractor-points sequentially (FIG. 4G, Methods). Of note, naïve CD4+ T cells reached their attractor point levels much earlier than naïve CD8+ T cells. Beyond this ordering, we calculated per individual the correlations between age-related cell-subset frequencies measured longitudinally and found numerous significant internal correlations (FIG. 13C-D, Methods). These results suggest that immune cell-subsets of older adults change together in a graded manner towards a high dimensional attractor point, corresponding to a new homeostasis. We thus aimed to explore immune-system dynamics from a high-dimensional perspective to assemble a robust representation of the individual's immune-system state that could not be achieved using single cell-subsets.

Example 5: Cellular Profiles Change Along a Trajectory Reflecting an Immune-Age

Our longitudinal measurements are sensitive to the environment and cover only a fraction of an individual's lifespan. We reasoned that by using the entire study population we may infer the underlying structure describing immune-system dynamics throughout an individual's adult life. For this, we represented each individual's immune-profile in a given year as the frequencies of the cell-subsets that changed longitudinally and applied on them the diffusion-pseudotime algorithm (Methods). Individuals' immune-profiles formed a non-branched trajectory, with young individuals' immune-profiles located at its extreme part (FIG. 5A). We leveraged the trajectory's linearity to assign the immune-profiles pseudotime values corresponding to their relative location along it. The assigned pseudotime values of older adults were significantly dependent on age (linear-regression P=5.96-10$^{-9}$, n=294 immune-profiles). Furthermore, the individual-slopes of older adults along the trajectory were significantly positive, as opposed to those calculated on the young, indicating the younger-adults stability compared to older adults (FIG. 5B, FIG. 14A, t-test P=0.36, 6.92-10$^{-19}$ for young (n=17) and older adults (n=55) having at least 3 pseudotime values, respectively).

To characterize the molecular processes captured by the trajectory, we calculated the slope along the trajectory of the frequency of each cell-subset classified as either fluctuating, linear or asymptotic. Fluctuating cell-subsets exhibited significantly smaller slopes along the trajectory compared to linear and asymptotic cell-subsets (t-test P=0.02, n=11,16, respectively, FIG. 5C, FIG. 14B, FIG. 19). Furthermore, the correlations between cell-subsets' frequencies against the trajectory were high, significantly more than those calculated against age (paired t-test P=1.2.10-4 (n=27 cell-subsets), FIG. 14B-C, FIG. 19), highlighting the close association between the trajectory and immune status.

Intra-cellular signaling responses to cytokines are known to be altered in older individuals compared to young, as captured by an aggregated cytokine response score (CRS) comprises from 14 assays spanning the major immune lineages. Since a longitudinal analysis of these features was not applicable due to technical reasons, we hypothesized that these longitudinal alterations may be captured cross-sectionally using the trajectory. We calculated the CRS per sample and observed a significant negative correlation with the trajectory that was consistent across years and was more significant than with age (FIG. 5D, FIG. 14D, Methods, median-regression P=0.028,0.41 (n=83 samples from 2011) for trajectory and age, respectively). Analyzing each cytokine response separately revealed five cytokine responses that significantly changed along the trajectory (Methods, BH-FDR<0.2, FIG. 14E). Taken together, the inferred trajectory describes the immune-system dynamics in aging with functional consequences, suggesting that it is an immune-aging axis whose value for an individual at a given time point we now define as an IMM-AGE score.

In order to determine if fewer cell populations could be measured and still accurately predict immune age, the pseudotime values calculated for individuals using all 18 cell populations were correlated to the values calculated using small numbers of cell populations (FIG. 17). Even using as few as 4 immune cell populations gave a spearman correlation of greater than 0.9, and reduction even to just 3 populations gave a spearman correlation of greater than 0.75. This indicates that many fewer populations, even as few as 3, are sufficient to be measured in order to accurately predict IMM-AGE score.

Example 6: IMM-AGE Score Predicts Mortality in Older Adults Better than Epigenetic Clock To assess some of the clinical implications of our immune-age metric, we correlated the baseline IMM-AGE score with longitudinal clinical information collected on the cohort. However, this analysis suffered from a poor statistical power due to the plethora of clinical events experienced by the cohort, a problem that was pronounced even more when assessing the clinical predictive power of single cell-subsets' frequencies. Similarly, and despite prior observations relating to age, we could not detect significant correlations between the IMM-AGE score and cardiovascular complications in this cohort, likely due to small cohort size. This indicated that while being correlated with the cytokine-response score metric, the IMM-AGE metric captures additional aspects of the immune-aging process.

We thus hypothesized that an improved understanding of the relation of IMM-AGE with clinics, specifically cardiovascular disease, may be gleaned by analyzing a larger cohort. Despite the availability of multiple large cardiovascular studies, the scarcity of high-resolution immune-profiling hinders direct assessment of the participants' IMM-AGE scores. To overcome this, we leveraged the richness of our dataset to associate between our cell-based IMM-AGE score and gene expression measurements, the latter is measured commonly. Specifically, we identified a candidate gene-set whose expression correlated significantly and consistently both with age and with IMM-AGE score (Methods, FIG. 15A). In accordance with cellular frequencies dynamics along the trajectory, downregulated genes were predominantly expressed by naïve CD8+ T-cells, naïve CD4+ T-cells and B-cells, whereas upregulated genes were predominantly expressed by cytotoxic NK-cells and terminally differentiated effector memory CD8+ T-cells (Methods, FIG. 15B, Binomial-test P=5.8-10$^{-11}$ (n=35 genes), 3.7-10$^{-9}$ (n=29 genes), 7.9.10-9 (n=33 genes), 1.52-10$^{-5}$ (n=17 genes) 1.44.104 (n=18 genes), respectively). Conversely, when we corrected the gene-expression data to variation in cellular frequencies, we could not detect any gene whose expression changed significantly along the trajectory, indicating the close correspondence between the identified gene-set and the cellular frequencies-derived trajectory (Methods).

Interestingly, when smaller numbers of genes were sampled, it was still possible to reliably reproduce the pseudotime value in the Ellison dataset. Use of only 50 or even 20 genes still gave a Spearman correlation of greater than 0.7 as compared to pseudotime values derived from directly measuring cellular frequencies (FIG. 18A). Indeed, analysis of the stepwise selection of genes showed only minimal changes in correlation with when anywhere from 20 to 100 genes were selected (FIG. 18B).

To test the association between IMM-AGE and cardiovascular disease, we leveraged the Framingham Heart Study for which rich clinical and cardiovascular information in addition to whole-blood gene-expression data are available for 2,292 participants aged 40-90 (Methods). Using a refined gene-set of 57 genes whose expression changed along the trajectory, we assigned each participant an approximated IMM-AGE score (FIG. 16A, Methods). Similar to our observation in the original longitudinal dataset, the IMM-AGE score significantly correlated with age (linear-regression P=1.54-10$^{-60}$, n=2,292). Furthermore, following age-adjustment males exhibited significantly higher IMM-AGE scores as compared to females (linear-regression P=7.22.10-27, n=2,292, FIG. 16B). As both are associated with cardiovascular disease risk, we adjusted the IMM-AGE scores to age and gender and identified a significant association between the adjusted values and cardiovascular state at baseline, such that individuals diagnosed with cardiovascular disease tended to exhibit an accelerated immune-aging (t-test P=2.34.10-3, n=2,292, FIG. 16C). Further adjustments of IMM-AGE score to other cardiovascular risk factors including: total and HDL cholesterol, diabetes, smoking and blood pressure in addition to age and gender resulted with a similar result (FIG. 16D, t-test P=0.04, n=2,292).

To further characterize the clinical predictive value of IMM-AGE score, we calculated a multivariate Cox-regression model of all-cause mortality rates against cardiovascular risk factors, existence of cardiovascular disease and the IMM-AGE score at baseline (Methods). We observed a significant association between baseline IMM-AGE score and overall survival during 7-years of follow-up (P=4.2. 10-4, n=2,290, HR=1.05 per 5-year increment). Moreover, stratification of individuals by their baseline IMM-AGE scores adjusted to these covariates resulted with a significant difference in overall survival between the groups (FIG. 6A, P=0.018, n=2,290, log-rank test).

Aging alters most physiological systems, potentially yielding a broad range of biological-age metrics. Of particular relevance is a DNA methylation-age metric that relies on aging effects on DNA methylation to estimate a biological clock of aging, a measure that was shown to be predictive to all-cause mortality. We sought to leverage the availability of methylation data on the Framingham participants to unravel whether there is a linkage between the aging aspects captured by the two biological age metrics. For this, we calculated the DNA methylation age of the Framingham participants and observed a significant correlation between the DNA methylation age and the IMM-AGE score that does not depend on cardiovascular risk factors and cardiovascular disease (Methods, FIG. '16E, linear-regression P=9.71.10$^{-8}$, n=2,139). To compare the clinical utility of the two metrics while considering their inherent correlation, we calculated a multivariate Cox model regressing all-cause mortality against cardiovascular risk factors, cardiovascular disease status, and both biological age metrics at baseline. The resulting association of IMM-AGE with overall survival was more than 500-fold more significant than the one obtained for the DNA methylation age, highlighting the pivotal role of immune-aging to survival (Methods, P-8.3.10$^{-5}$, 0.051; 5-year increment HR=1.05, 1.11, IMM-AGE and DNA methylation age, respectively, n=2,159).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method of diagnosing and treating an increased risk of cardiovascular disease of a subject, comprising:
   (a) measuring relative abundance of at least 3 immune cell populations in a blood sample from said subject;
   (b) determining an immunological age of said subject by at least one of:
      (i) comparing said measurement of relative abundance of immune cell populations to a dataset of measurements of immune cell population relative abundance in subjects with predetermined immunological ages, wherein said comparing comprises employing a distance metric with respect to immune cell population abundance in said sample and samples of said dataset or selecting from said dataset individuals with a smallest distance with respect to relative abundance of said at least 3 immune cell populations and averaging an immunological age of said selected individuals; and
      (ii) combining said measurement of relative abundances with data of measurements of relative abundance from at least 19 other subjects to produce a database, calculating from said database a trajectory for all at least 20 subjects based on said measurements of relative abundance, wherein said calculating a trajectory comprises applying a diffusion-pseudotime algorithm to said population relative abundancies;
   (c) diagnosing said subject whose immunological age is greater than said subject's chronological age with an increased risk of cardiovascular disease or diagnosing said subject whose immunological age is greater than an immunological age of at least one other subject of the same chronological age with an increased relative risk of cardiovascular disease; and
   (d) administering to said subject diagnosed with increased risk of cardiovascular disease or relative increased risk of cardiovascular disease a cardiovascular medication selected from: a statin, aspirin, an anticoagulant, an antiplatelet agent, an angiotensin receptor blocker, a beta blocker, a calcium channel blocker, a diuretic and a vasodilator;

thereby diagnosing and treating an increased risk of cardiovascular disease in a subject.

2. The method of claim 1, wherein said at least 3 immune cell populations are selected from the group consisting of: naïve CD8+ T cells, effector CD8+ T cells, CD28− CD8+ T cells, B cells, CXCR5+ CD4+ T cells, CD161− CD45RA+ T regulator cells, naïve CD4+ T cells, CXCR5+ CD8+ T cells, HLADR− CD38+ CD4+ T cells, Th17 CXCR5− CD4+ T cells, T cells, CD85j+ CD8+ T cells, CD57+ CD8+ T cells, Th2 non-TFH CD4+ T cells, PD1+ CD8+ T cells, effector memory CD4+ T cells, CD27+ CD8+ T cells, lymphocytes, central memory CD4+ T cells, natural killer (NK) cells, monocytes, Th1 TFH CD4+ T cells, CD8+ T cells, CXCR3− CCR6− CXCR5+ CD8+ T cells, Th2 TFH CD4+ T cells, plasmablasts, and CD94+ NK cells.

3. The method of claim 2, wherein said at least 3 immune cell populations are selected from the group consisting of: naïve CD8+ T cells, effector CD8+ T cells, CD28− CD8+ T cells, B cells, CXCR5+ CD4+ T cells, CD161− CD45RA+ T regulator cells, naïve CD4+ T cells, CXCR5+ CD8+ T cells, HLADR− CD38+ CD4+ T cells, Th17 CXCR5− CD4+ T cells, T cells, CD85j+ CD8+ T cells, CD57+ CD8+ T cells, Th2 non-TFH CD4+ T cells, PD1+ CD8+ T cells, and effector memory CD4+ T cells.

4. The method of claim 3, wherein said at least 3 immune cell populations are selected from the group consisting of: naïve CD8+ T cells, effector CD8+ T cells, CD28− CD8+ T cells, B cells, CXCR5+ CD4+ T cells, CD161− CD45RA+ T regulator cells, naïve CD4+ T cells, CXCR5+ CD8+ T cells, HLADR− CD38+ CD4+ T cells, Th17 CXCR5− CD4+ T cells, and T cells.

5. The method of claim 1, wherein said measuring a population's abundance comprises measuring abundance of at least one epitope indicative of said immune cell population, optionally wherein said measuring extracellular epitopes is by FACS analysis, wherein a population is gated based on the expression level of said at least one indicative epitope.

6. The method of claim 1, wherein said determining an immunological age of said subject comprises comparing said measurement of relative abundance of immune cell populations to a dataset of measurements of immune cell population relative abundance in subjects with predetermined immunological ages and wherein said comparing comprises employing a distance metric with respect to immune cell population abundance in said sample and samples of said dataset.

7. The method of claim 1, wherein determining an immunological age is by combining said measurement of relative abundances with data of measurements of relative abundance from at least 19 other subjects to produce a database and calculating from said database a trajectory for all at least 20 subjects based on said measurements of relative abundance, wherein said calculating a trajectory comprises applying a diffusion-pseudotime algorithm to said population relative abundancies.

8. The method of claim 1, wherein said measuring immune cell relative abundance comprises estimating immune cell relative abundance by measuring gene expression in said blood sample.

9. The method of claim 8, wherein measuring gene expression in blood comprises measuring the expression of at least 20 genes selected from the group consisting of: ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, HLA-DOB, AGPAT4, AKAP2, APBB1, ASCL2, C1orf21, C20orf3, CHST12, CST7, CTSW, EEF1B2, ELL3, FAM113B, FAM129C, FCER2, FCGBP, FCRL6, FGFBP2, FLT3LG, GAL3ST4, GPR56, GPR68, GZMH, HOXC4, ID3, LLGL2, LTB, MMP23A, MOBKL2B, MXRA7, MY06, NKG7, NOG, NOSIP, PCYOX1L, PLEKHF1, PMEPA1, RNF157, RPL12, RPL24, RPS10, RPS13, RPS5, SAP30, SESN2, SYTL3, TBX21, TGFBR3, TNFRSF25, TSPAN13, TTC28, YPEL1, ZNF154, ZNF563, ZNF772, ZSCAN18, C2orf89, PATL2, TTC38, PRR5L, SGK223, NCRNA00287, IGHM, HLA-DOA and IGHV5-78.

10. The method of claim 9, wherein measuring gene expression in peripheral blood comprises measuring the expression of at least 20 genes selected from the group consisting of: ABLIM1, AFF3, BACH2, BCL11A, BIRC3, BLNK, BTLA, C11orf31, C6orf48, CCR6, CCR7, CD200, CD22, CD27, CD28, CDCA7L, CHMP7, CR2, DPP4, E2F5, EPHX2, FAIM3, FAM102A, FAM134B, FCRL1, FCRL2, HOOK1, HVCN1, IL6ST, IMPDH2, AA0748, LEF1, LRRN3, MYC, NELL2, NT5E, P2RX5, PAQR8, PLAG1, PTPRK, RCAN3, SCML1, SLC7A6, SNX9, STRBP, SUSD3, TCF4, TCF7, TCL1A, TCTN1, UXT, VPREB3, ZNF101, ZNF671, CRTC3, STAP1, and HLA-DOB.

11. The method of claim 1, wherein said blood sample is a peripheral blood sample.

\* \* \* \* \*